(12) United States Patent
Imai

(10) Patent No.: US 7,042,527 B2
(45) Date of Patent: May 9, 2006

(54) FIELD SEQUENTIAL DISPLAY OF COLOR VIDEO PICTURE WITH COLOR BREAKUP PREVENTION

(75) Inventor: Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 593 days.

(21) Appl. No.: 09/943,212

(22) Filed: Aug. 30, 2001

(65) Prior Publication Data

US 2002/0024618 A1    Feb. 28, 2002

(30) Foreign Application Priority Data

Aug. 31, 2000    (JP) ............................. 2000-263065

(51) Int. Cl.
*H04N 9/475*    (2006.01)

(52) U.S. Cl. ...................... 348/742; 348/743; 348/273; 348/276; 348/277

(58) Field of Classification Search ................ 348/272, 348/273, 276, 277, 279, 368, 739, 742, 743, 348/744; H04N 9/745
See application file for complete search history.

(56) References Cited

U.S. PATENT DOCUMENTS

| 4,907,862 | A | * | 3/1990 | Suntola ........................ 349/61 |
| 5,784,038 | A | * | 7/1998 | Irwin ........................... 345/88 |
| 6,034,666 | A | * | 3/2000 | Kanai et al. ................. 345/593 |
| 6,453,067 | B1 | * | 9/2002 | Morgan et al. .............. 382/162 |
| 6,621,488 | B1 | * | 9/2003 | Takeuchi et al. ............ 345/204 |
| 6,738,104 | B1 | * | 5/2004 | Marshall ...................... 348/743 |

FOREIGN PATENT DOCUMENTS

| JP | 07-318939 | | 12/1995 |
| JP | 08-101672 | * | 4/1996 |
| JP | 08-248381 | | 9/1996 |
| JP | 2000-078602 | | 3/2000 |

* cited by examiner

*Primary Examiner*—John Miller
*Assistant Examiner*—Trang U. Tran
(74) *Attorney, Agent, or Firm*—Scully, Scott, Murphy & Presser, P.C.

(57) ABSTRACT

A method of displaying a color video picture according to a field sequential process is provided. A display device displays an image comprising a matrix of pixels. One frame image is composed of four field images ranging from a first field image to a fourth field image. With four adjacent pixels handled as one unit, the colors R, G, B, W of illuminating lights applied to the pixels in each unit are different from each other, and the arrangement of the colors is successively switched or changed in each field period. Information representing the colors R, G, B, W separated from a video signal is displayed sequentially in successive fields at positions corresponding to the colors of the illuminating lights applied to the pixels and times at which the illuminating lights are applied to the pixels.

28 Claims, 14 Drawing Sheets

Fig. 3a (Prior Art)
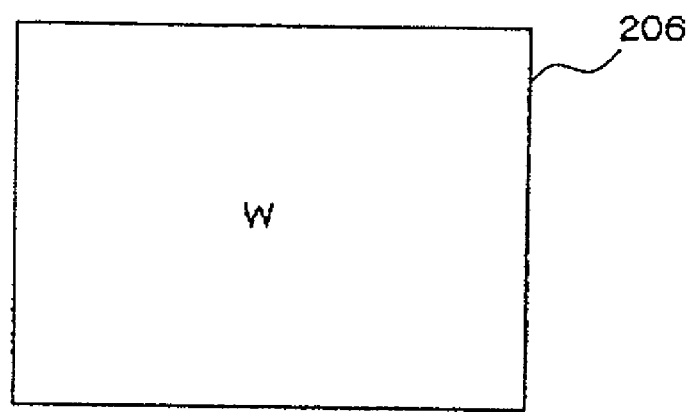
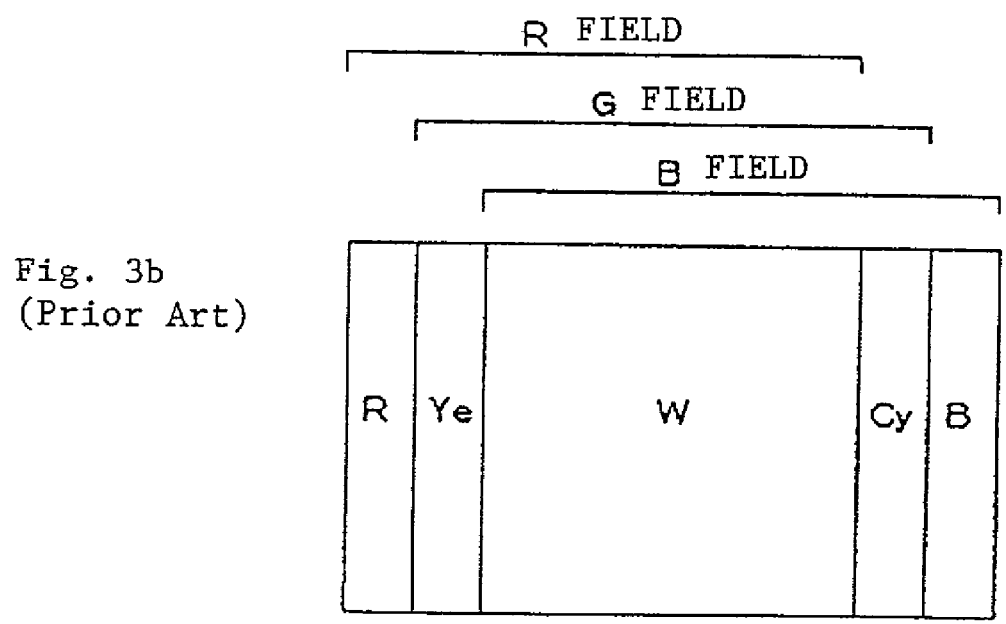
Fig. 3b
(Prior Art)

FIELD SEQUENTIAL DISPLAY OF COLOR VIDEO PICTURE WITH COLOR BREAKUP PREVENTION

BACKGROUND OF THE INVENTION

1. Field of the Invention

The present invention relates to a method of and an apparatus for displaying a color video picture by sequentially displaying color images on a display device and switching illumination light colors depending on the displayed color images.

2. Description of the Related Art

Various different processes are employed to display color video pictures on display devices such as liquid crystal display devices. For displaying a color video picture on a direct-view-type liquid crystal display apparatus, red (R), green (G), and blue (B) microcolor filters are associated with pixels arranged in a matrix to pass either one of R, G, B lights separated from white light emitted by a back light source with respect to each of the pixels, and the transmittance of the liquid crystal is modulated with a video signal at each of the R, G, B pixels. The full color display of each picture element, which is composed of three R, G, B pixels, is based on a spatial additive mixture (juxtaposed additive mixture) of color primaries of the three R, G, B pixels. According to this process, since a full color video picture can be displayed on a single liquid crystal display device, it is possible to construct a low-cost, small-size display apparatus. However, the liquid crystal display apparatus fails to make full use of the resolution of the liquid crystal display device used because the number of picture elements of a video picture displayed by the liquid crystal display apparatus is one-third of the number of pixels of the liquid crystal display device.

For displaying a color video picture on a projection-type liquid crystal display apparatus, white light emitted by a light source is divided into three color primaries of R, G, B, which are modulated by respective liquid crystal display devices disposed in the paths of the color primaries, based on a video signal, and the three color primary images are projected by a projection lens onto a screen to produce a color video picture thereon. The full color display of each picture element is based on an additive mixture (simultaneous additive mixture) at one spot of color primaries of the three R, G, B pixels. Since the number of picture elements of a video picture displayed on a screen is the same as the number of pixels of each of the liquid crystal display devices, the liquid crystal display apparatus is capable of producing a high-resolution color video picture. However, the liquid crystal display apparatus is large and expensive to manufacture because the liquid crystal display devices for generating the three color primary images are required and an optical system is needed for color separation and color combination.

Another process different from the above two processes is based on an additive mixture (successive additive mixture) of three color primaries which is achieved when the colors of R, G, B are cyclically changed at a rate beyond the limit of the time resolution of the human eye. This process is referred to as a field sequential process or a color sequential process, and displays a color video picture by cyclically changing R, G, B images at a high speed.

FIG. 1 of the accompanying drawings shows at an enlarged scale a temporal succession of displayed images, illustrative of a conventional field sequential display process. According to the conventional field sequential display process, one frame period is divided into three color fields including an R field, a G field, and a B field. To allow the observer to view displayed images without flickering, the frame frequency should preferably be 60 Hz or higher, and hence the field frequency should be 180 Hz or higher. When R, G, B images are cyclically changed at a high speed and displayed at the above field frequency, each pixel 204 in displayed image 206 looks white to the observer due to the mixing of the three colors R, G, B. A display apparatus that operates according to the field sequential display process can produce high-resolution color video pictures because the number of picture elements thereof is the same as the number of pixels of each of displayed images 206. Since the display apparatus has only one display device, the display apparatus is not large and can be manufactured inexpensively.

FIG. 2 of the accompanying drawings shows a conventional field sequential display apparatus as disclosed in Japanese laid-open patent publication No. 7-318939, for example. The disclosed field sequential display apparatus has color wheel 200 comprising sectorial R, G, B color filters and motor 202 which rotates color wheel 200 to produce R, G, B temporal illuminating lights from white light emitted by light source 207. Based on a video signal applied to the field sequential display apparatus, rotation controller 208 for controlling the timing of the colors of the illuminating lights and liquid crystal driver 203 for displaying images of the colors are synchronized to display a temporal succession of R, G, B color images on display device 201 for thereby displaying a full color video picture thereon.

Other color display apparatus include a color display apparatus for successively switching on three R, G, B light sources at a high speed to display R, G, B images in synchronism with the light sources and a color display apparatus which has a color filter unit, i.e., a color shutter, capable of cyclically changing colors in front of a black-and-white display device. These color display apparatus are advantageous in that they can produce high-resolution color video pictures as the number of picture elements thereof is the same as the number of pixels of the display device, and they have only one display device.

Another projection-type field sequential color display apparatus has a display device comprising pixels each in the form of a minute movable mirror that can be displaced to turn on and off, i.e., modulate, illuminating light.

However, the above field sequential color display apparatus suffer a problem in that since achromatic images such as white (W) images and images of intermediate colors are represented by a temporal combination of R, G, B images, if the observer abruptly moves its line of sight while a white dot or object, for example, is being displayed, then the R, G, B images formed on the retina are displaced, and their colors R, G, B fail to be mixed into white, but are perceived as being separated from each other.

FIGS. 3a and 3b of the accompanying drawings show displayed images which are illustrative of the problem of the field sequential display process. As shown in FIG. 3a, the observer can see displayed white (w) image 206 as a normal white image as long as the observer observes the image with a fixed line of sight. However, if the observer abruptly moves the line of sight horizontally, for example, then, as shown in FIG. 3b, the observer instantaneously perceives strips of primary colors R, B and intermediate colors Ye (Yellow), Cy (Cyan) on both sides of the white image.

A quick motion of the line of sight is referred to as "saccade", and may cover up to 15° in $\frac{1}{100}$ second when the eyeball moves fast. For example, while R, G, B images are being cyclically changed at the frequency of 180 Hz on the display screen that is 1 m spaced from the observer, if the observer abruptly moves the line of sight, then the R, G, B images are displaced 15 cm each. The same phenomenon occurs when the observer blinks rather than moving the line of sight. This phenomenon gives an instantaneous strong stimulus in the form of flickering primary color lights to the observer, making the observer feel uncomfortable and fatigued. Furthermore, when the observer swiftly moves a hand in front of displayed image 206, the shadow of the hand appears in divided colors. When the observer moves the line of sight smoothly to follow a displayed white object, since the R, G, B images thereof are slightly displaced with time differences, the edge of the object appears with colors.

The above phenomenon is referred to as "color breakup", which is a most serious drawback to be eliminated in the field sequential color display processes and apparatus. One attempt to reduce the color breakup is to increase the field frequency of R, G, B fields. For example, the field frequency may be increased 10 times to reduce the color breakup to $\frac{1}{10}$. However, since the field frequency becomes 1800 Hz, the frequency of a drive signal for the display device also increases, and the video signal processing requires a high-speed memory. The burden on the display device is too large for the reduction of the color breakup that is achieved.

According to another effort for reducing the color breakup, a white (W) field is added among the R, G, B fields (see Japanese laid-open patent publication No. 8-101672, for example). This scheme is effective to prevent a color breakup from occurring with respect to a white image (achromatic image) because it is displayed in white itself rather than the combination of R, G, B colors. However, images other than achromatic images still suffer a color breakup upon an abrupt motion of the line of sight because those images are displayed on the basis of R, G, B images.

SUMMARY OF THE INVENTION

It is therefore an object of the present invention to provide a method of and an apparatus for displaying a color video picture based on the field sequential display principles while preventing color breakups from occurring and being visually perceived.

According to the present invention, there is provided a method of displaying a color video picture by sequentially displaying color images on a display device and switching illumination light colors depending on the displayed color images according to a field sequential process, comprising the steps of illuminating a display device having a matrix of pixels, with adjacent four pixels as a unit, with illuminating lights including a red illuminating light, a green illuminating light, a blue illuminating light, and an achromatic illuminating light, such that the illuminating lights applied to the pixels in each unit have different colors from each other and the colors of the illuminating lights are switched in each field period, generating a red video signal, a green video signal, a blue video signal, and an achromatic video signal from a color video signal so as to correspond to the colors of the illuminating lights applied to the pixels in each unit, and energizing the display device with the generated video signals to display a color video picture thereon.

The method may further comprise the step of projecting the color video picture displayed on the display device.

With the above method, a high-definition full color video picture can be displayed on a single display device according to successive additive mixture of colors. Since an achromatic color component is generated and added to displayed images, the colors of close pixels in each field image are mixed by way of juxtaposed additive mixture, so that each field image does not become a field image of a primary color which is entirely different from a frame image. Even if the observer abruptly moves the line of sight horizontally, seeing field images as being spatially displaced, each field image does not give a strong stimulus in the form of flickering primary color lights to the observer, who does not visually perceive color breakups while viewing a color video picture composed of field images.

The above and other objects, features, and advantages of the present invention will become apparent from the following description with reference to the accompanying drawings which illustrate examples of the present invention.

BRIEF DESCRIPTION OF THE DRAWINGS

FIGS. 3a and 3b are views showing displayed images which are illustrative of the problem of a field sequential display process;

DESCRIPTION OF THE PREFERRED EMBODIMENTS

Figure 1:
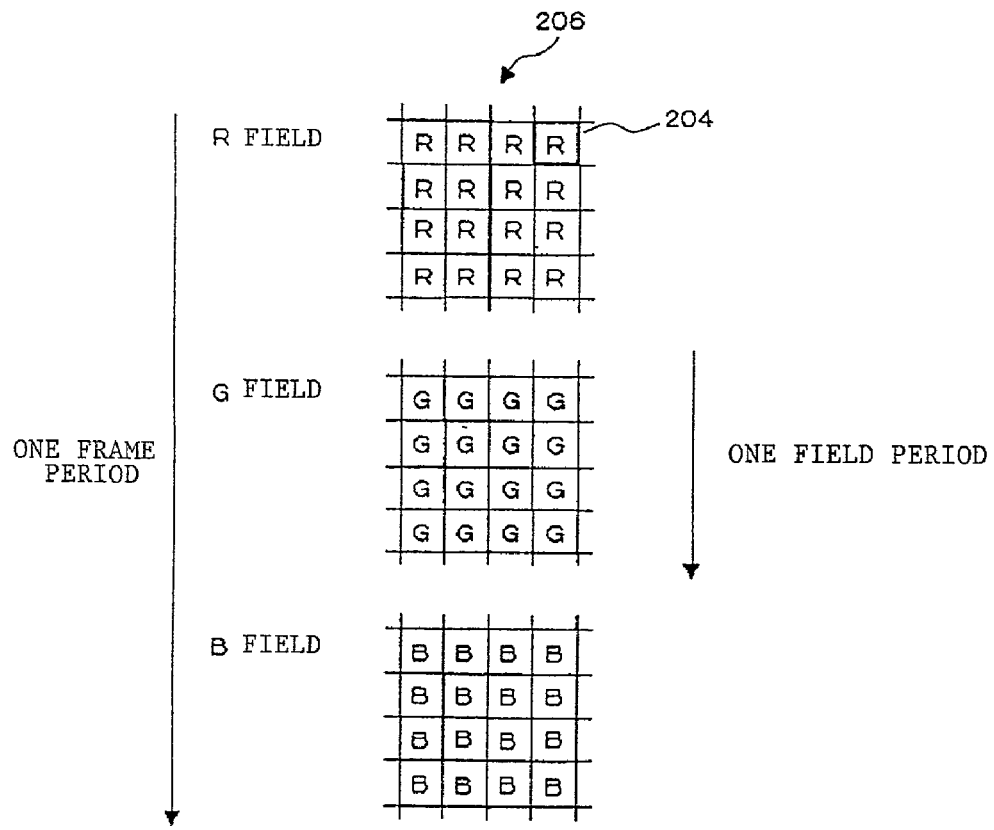
FIG. 1 is an enlarged diagram showing a temporal succession of displayed images, illustrative of a conventional field sequential display process.
Figure 2:
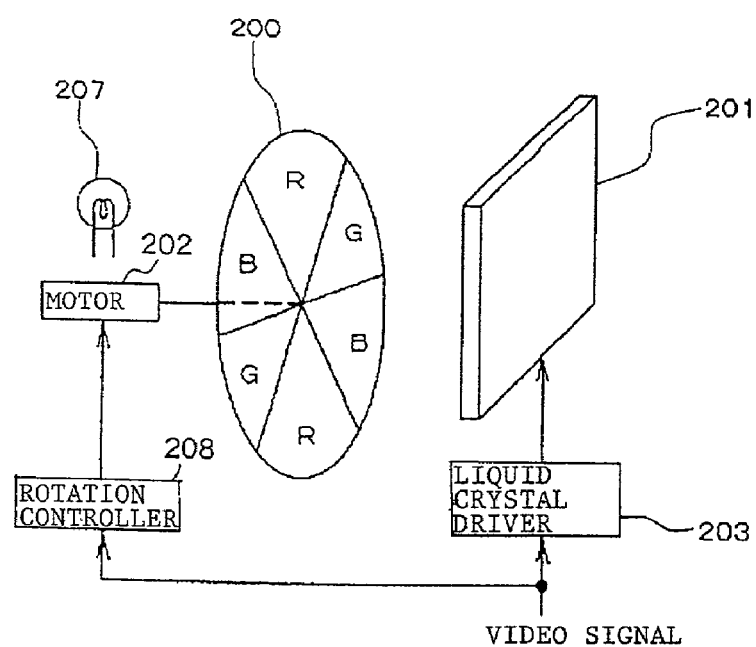
FIG. 2 is a view, partly in block form, showing a conventional field sequential display apparatus.
Figure 4:
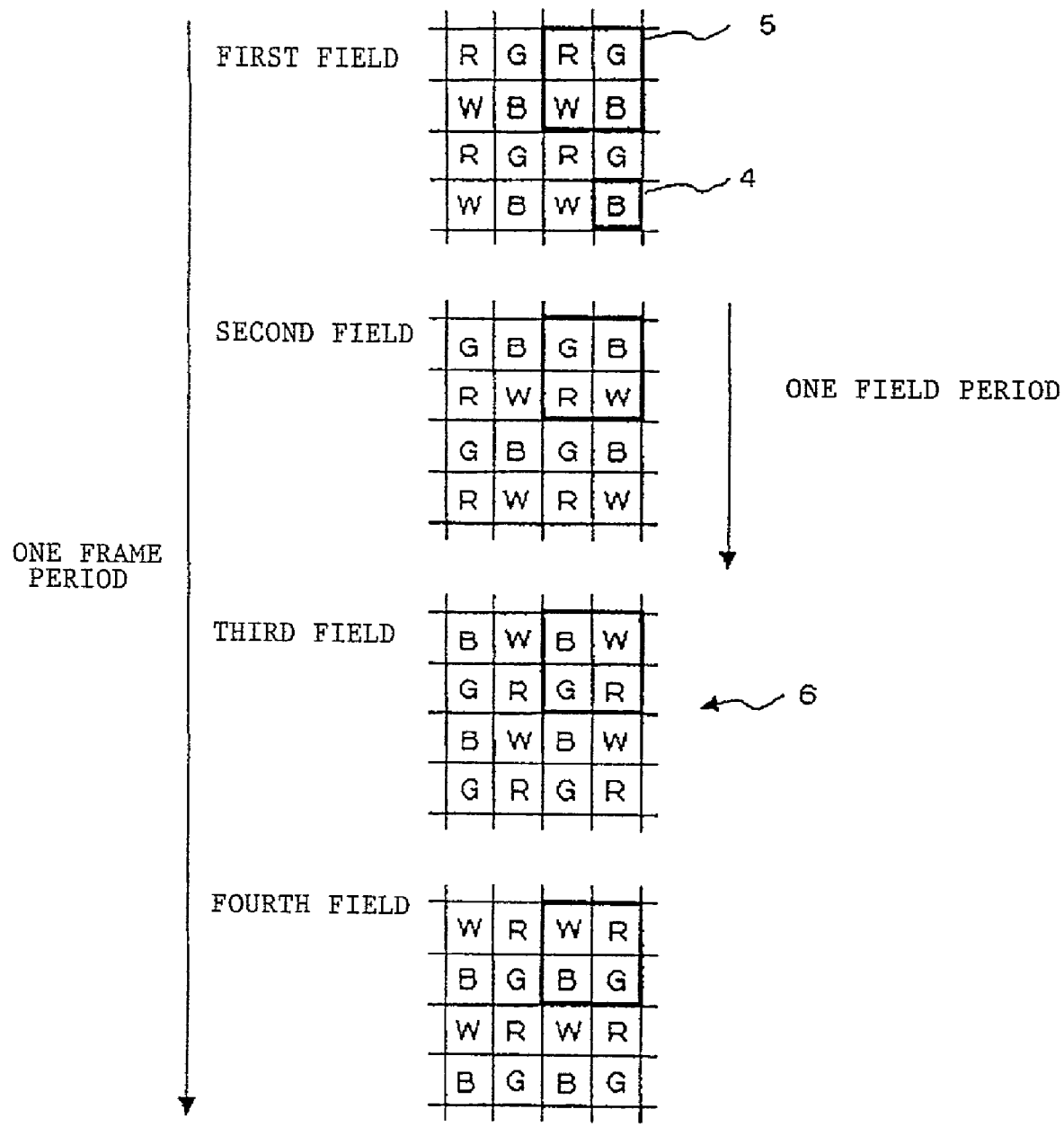
FIG. 4 is an enlarged diagram showing a temporal succession of displayed images, illustrative of a display process according to a first embodiment of the present invention.

1st Embodiment:

FIG. 4 shows at an enlarged scale a temporal succession of displayed images, illustrative of a display process according to a first embodiment of the present invention. As shown in FIG. 4, a matrix of pixels 4 is arrayed in displayed image 6 on a display device. One frame of image is composed of four fields of image including first through fourth fields. A set of adjacent four pixels in the matrix of pixels 4 is handled as a unit 5 in the form of a square matrix. Illuminating lights applied to the respective four pixels of picture element 5 have respective colors different from each other, and the arrangement of colors in each unit 5 is cyclically changed in successive four fields. Information representing separate colors R, G, B, W based on a video signal is displayed in pixels 4 at positions and times corresponding to the colors of the illuminating lights applied to pixels 4, successively in fields of image. If the frequency of frames is 60 Hz (one frame period is about 16.7 msec.), then the frequency of fields is 240 Hz (one field period is 4.2 msec.). When R, G, B, W pixels 4 are switched and displayed at the above field frequency, the observer visually perceives pixels 4 as representing mixed colors according to successive additive mixture of colors. Therefore, high-definition full color video pictures can be displayed on the single display device.

Display image 6 may be either an image directly displayed on the display screen of the display device or an image projected from the display screen of the display device. The image projected from the display screen of the display device may be either an image projected onto a projection screen by a lens or a mirror or an image observed through a lens or a mirror, i.e., an image projected onto the retina.

The illuminating lights applied to the pixels are not limited to the arrangement and switching sequence shown in FIG. 4, but may be arranged in horizontal or vertical stripes of the colors R, G, B, W. However, the illuminating lights should preferably not be directional as nondirectional illuminating lights are effective for motions of the line of sight in any direction. More preferably, the illuminating lights should be arranged in a square pattern as shown in FIG. 4 such that the colors G, W having large luminance components are positioned diagonally opposite in relation, for the purpose of reducing flickering and color scrolling upon changing of the colors.

Figure 5A:
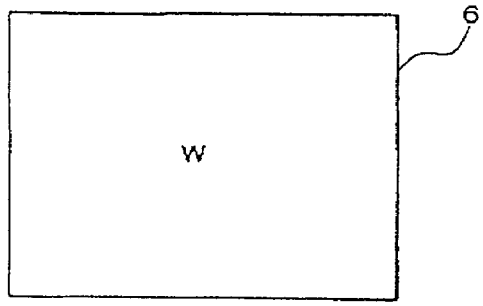
FIGS. 5a and 5b are views showing displayed images which are illustrative of the effect of the display process according to the first embodiment of the present invention.
Figure 5B:
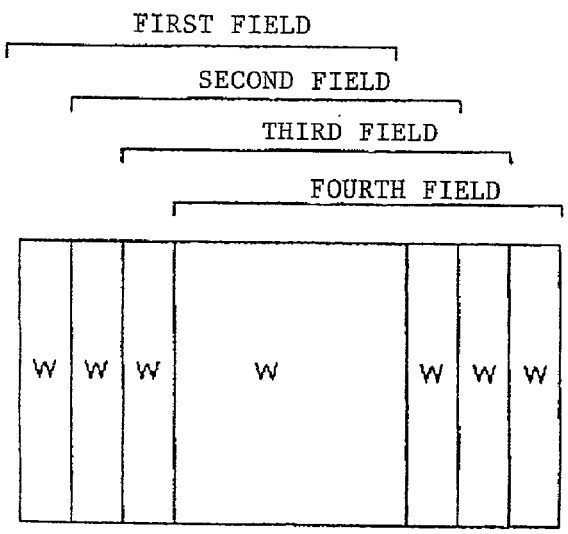

FIGS. 5a and 5b show displayed images which are illustrative of the effect of the display process according to the first embodiment of the present invention. As shown in FIG. 5a, when white (W) image 6 is displayed on the display device by the display process according to the first embodiment, the observer can see displayed white (W) image 6 as a normal white image by way of successive additive mixture as long as the observer observes the image with a fixed line of sight. Field images are not conventional R, G, B field images, but fields of R, G, B, W pixels that exist together. As shown in FIG. 5b, if the observer abruptly moves the line of sight horizontally, seeing the field images as being spatially displaced, then since the observer's visual acuity is lowered upon the abrupt motion of the line of sight, each of the field images is subject to the juxtaposed additive mixture of colors in adjacent pixels, and no appreciable color differences occur between temporally successive field images. Stated otherwise, the field images do not present flickering stimuli of strong primaries to the observer, but cause the observer to observe instantaneous white strips by way of the juxtaposed additive mixture of colors in adjacent pixels. The above display process applies to not only white images, but also images of intermediate colors where each of the field images is subject to the juxtaposed additive mixture of colors in adjacent pixels, and no appreciable color differences occur between temporally successive field images. With the display process according to the present embodiment, therefore, the observer does not visually perceive the color breakup in displayed color video pictures.

Figure 6:
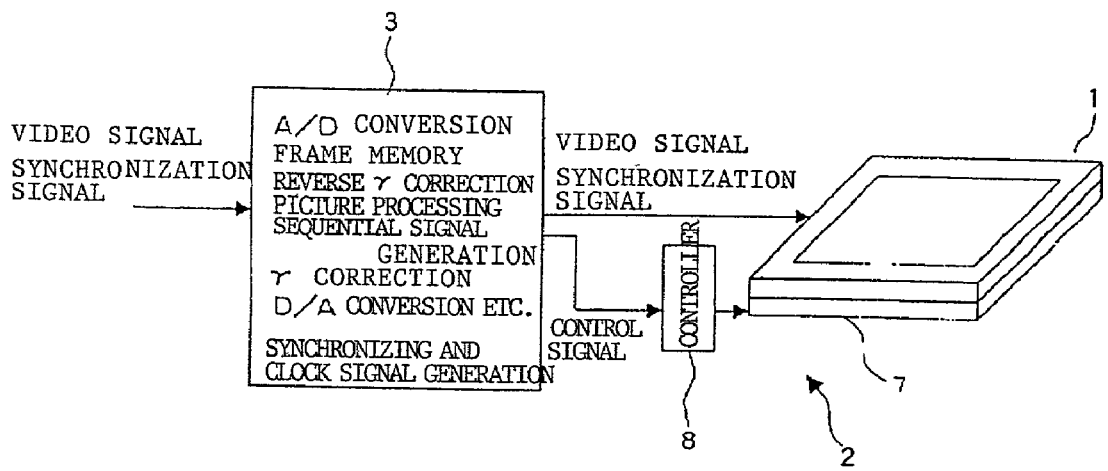
FIG. 6 is a view, partly in block form, showing a color video picture display apparatus according to a second embodiment of the present invention.

2nd Embodiment:

FIG. 6 shows, partly in block form, a color video picture display apparatus according to a second embodiment of the present invention. As shown in FIG. 6, the color video picture display apparatus comprises display device 1, color switching illumination unit 2, and video signal processor 3.

Display device 1 is a non-emissive-type display device having a matrix of pixels, and modulates the intensity of illuminating light applied to the pixels depending on a video signal. For example, display device 1 comprises an active-matrix liquid crystal display device with thin-film transistors (TFT) arranged at the respective pixels for displaying high-contrast, high-quality video pictures. According to the field sequential display process, the display device is required to display high contrast video pictures because a color reproduction range would be reduced unless illuminating lights other than desired colors were sufficiently cut off. According to the field sequential display process, furthermore, the display device requires a high-speed response because illuminating lights other than desired colors would be mixed unless a response time of the pixels were completed within the period of one field. Liquid crystal display devices which employ a twisted nematic (TN) liquid crystal achieves such a high-speed response a cell gap thereof, i.e., the distance between a pixel electrode and a common electrode, is reduced to 2 µm or less. Liquid crystal display devices may use other liquid crystals, e.g., a high-speed response mode liquid crystal subjected to a different orientation process or liquid crystal materials having a high-speed response which include a ferroelectric liquid crystal and antiferroelectric liquid crystal. The display device may employ a material other than the liquid crystal, e.g., a PLZT as a material having an electro-optic effect, or may comprise a display device for mechanically modulating the amount of light that is transmitted therethrough or reflected thereby.

Color switching illumination unit 2 produces a red illuminating light, a green illuminating light, a blue illuminating light, and an achromatic (white) illuminating light. A set of adjacent four pixels in the matrix of pixels of display device 1 is handled as a unit in the form of a square matrix, and color switching illumination unit 2 is arranged such that the colors of illuminating lights applied from color switching illumination unit 2 to those pixels are different from each other and are switched or changed in each field period. Color switching illumination unit 2 comprises at least illuminating device 7 and control device 8. The illuminating lights applied to the pixels are not limited to the arrangement and switching sequence shown in FIG. 4, but may be arranged in horizontal or vertical stripes of the colors R, G, B, W. However, the illuminating lights should preferably not be directional as the nondirectional illuminating lights are effective for motions of the line of sight in any directions. More preferably, the illuminating lights should be arranged in a square pattern as shown in FIG. 4 such that the colors G, W having large luminance components are positioned in diagonally opposite relation, for the purpose of reducing flickering and color scrolling upon changing of the colors.

Video signal processor 3 generates a red video signal, a green video signal, a blue video signal, and an achromatic (white) video signal from a color video signal in order to display each field image in positional and timed synchronism with the colors of the illuminating lights applied to the pixels of display device 1. More specifically, video signal processor 3 converts a supplied analog video signal into a digital video signal, and stores the digital video signal in a frame memory. At the same time, video signal processor 3 generates a synchronizing signal of field images and a clock signal of pixels from a supplied frame image synchronizing signal. If necessary, video signal processor 3 may increase a frame frequency and a field frequency. Video signal processor 3 cancels the CRT γ correction of the digital video signal stored in the frame memory, and then generates an achromatic video signal and converged R, G, B video signals from R, G, B video signals. For example, video signal processor 3 determines a minimum value of R, G, B color components as an achromatic component, subtracts the achromatic component from the R, G, B color components to produce converted R, G, B color components, and stores the achromatic component and the converted R, G, B color components in the frame memory. In order to increase the luminance of intermediate colors, video signal processor 3 may use the R, G, B color components as they are without subtracting the achromatic component therefrom or may multiply the achromatic component by a certain constant and then subtract the achromatic component from the R, G, B color components. If necessary, video signal processor 3 may convert the resolution by performing an interpolation process to enlarge or reduce image sizes, or may process the video signals for higher image quality by emphasizing contrast and edges. Then, video signal processor 3 reads the R. G, B, W color signals at a fourfold clock frequency for a field sequential process and generates R, G, B, W temporal video signals. At this time, video signal processor 3 converts the pixel arrangement of the R, G, B, W color signals such that necessary color signals will be supplied to pixels corresponding to the colors of the illuminating lights from color switching illumination unit 2. Thereafter, video signal processor 3 processes the video signals for γ correction depending on display device 1, converts the video signals into analog video signals, and applies the analog video signals to a drive circuit of display device 1, which processes the analog video signals for polarity conversion, if necessary, and then energizes display device 1. At the same time, video signal processor 3 sends a control signal to color switching illumination unit 2, enabling control device 8 to synchronize the video display on display device 1 and the color switching on color switching illumination unit 2 with each other.

The video display on display device 1 and the color switching on color switching illumination unit 2 can be synchronous with each other according to either one of the following two processes: According to one process, illuminating device 7 of color switching illumination unit 2 is de-energized while one field of image is being rewritten on display device 1, and energized after the display of one field of image is completed until a next field of image starts being rewritten. In order to complete the display of one field of image quickly, the display region of display device 1 may be divided into a plurality of regions, and these divided regions may be energized parallel to each other. According to the other process, if an image displayed on display device 1 is rewritten by a line sequential process, then illuminating device 7 is switched by a line sequential process in synchronous with the scanned position on display device 1. In the other process, the display region of display device 1 may also be divided into a plurality of regions, and these divided regions may also be energized parallel to each other. In either of the above two processes, illuminating device 7 should preferably be de-energized in a period corresponding to the response time of display device 1 for preventing unwanted color components, i.e., different color components in preceding and following fields, from being displayed.

The color video picture display apparatus shown in FIG. 6 is capable of producing displayed image 6 shown in FIG. 4. Even if the observer abruptly moves the line of sight horizontally, seeing the field images as being spatially displaced, as shown in FIG. 5b, no appreciable color differences occur between temporally successive field images. Consequently, the color video picture display apparatus can display high-definition full color video pictures on single display device 1 according to the field sequential process while preventing the observer from visually recognizing color breakups.

Figure 7:
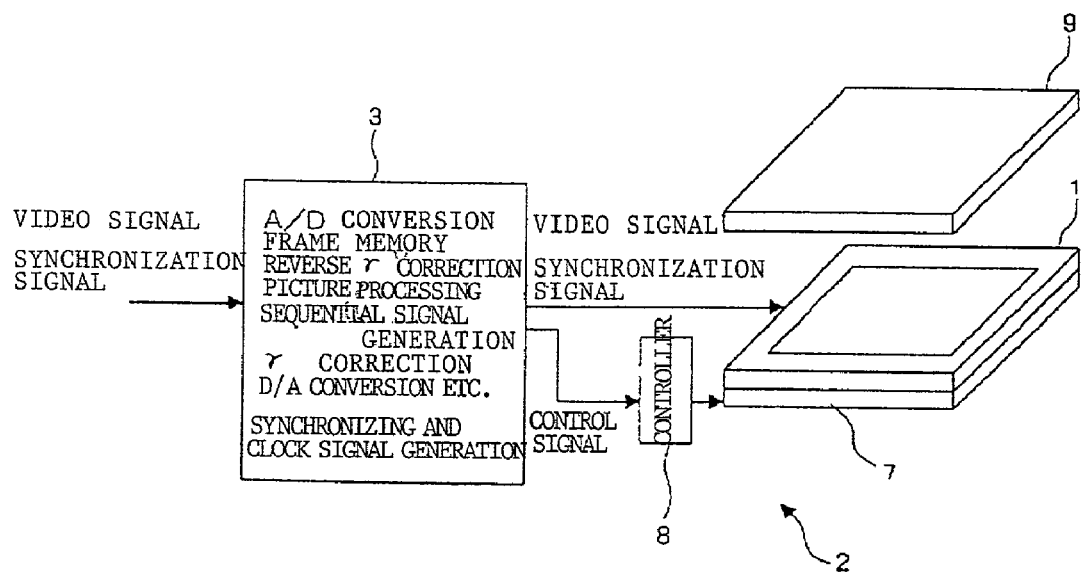
FIG. 7 is a view, partly in block form, showing a color video picture display apparatus according to a third embodiment of the present invention.

3rd Embodiment:

FIG. 7 shows, partly in block form, a color video picture display apparatus according to a third embodiment of the present invention. As shown in FIG. 7, the color video picture display apparatus comprises display device 1, color switching illumination unit 2, video signal processor 3, and projecting unit 9. Display device 1, color switching illumination unit 2, and video signal processor 3 of the color video picture display apparatus according to the third embodiment are identical to those of the color video picture display apparatus according to the second embodiment. The color video picture display apparatus according to the third embodiment differs from the color video picture display apparatus according to the second embodiment in that it additionally has projecting unit 9 for projecting video pictures displayed on display device 1.

Projecting unit 9 is a projection lens assembly comprising a plurality of lenses for projecting a video picture displayed on display device 1 onto a screen, not shown, at an enlarged scale. The projection lens assembly should preferably be aberration-corrected to project a video picture displayed on display device 1 clearly without distortions. Particularly, the projection lens assembly needs to be corrected sufficiently for magnification and chromatic aberration because if not corrected sufficiently, the positions of R, G, B, W pixels would be displaced on the screen. The projection lens assembly has a focus adjusting mechanism for focusing the displayed video picture at a desired position on the screen, and a zoom mechanism for enlarging the size of the displayed video picture to a desired size on the screen. Projecting unit 9 may additionally include a mirror for bending the path of the projected light.

Projecting unit 9 is not limited to the projection lens assembly, but may comprise a plurality of spherical or aspherical mirrors for projecting video pictures. Such spherical or aspherical mirrors are advantageous in that they do not cause chromatic aberration which would result from a wavelength-depending dispersion of the refractive indexes of lenses. Alternatively, projecting unit 9 may comprise a combination of lenses and mirrors or a combination of optical parts such as prisms and holograms.

Projecting unit 9 may also comprise an arrangement for projecting images through lenses and mirrors, i.e., an arrangement for projecting images onto the retina, other than the above arrangement for projecting images onto the screen. For example, the present embodiment is applicable to a head-mounted display unit, a wearable display unit, or a unit for observing at an enlarged scale images produced by a portable device.

The color video picture display apparatus shown in FIG. 7 is capable of producing displayed image 6 shown in FIG. 4. Even if the observer abruptly moves the line of sight horizontally, seeing the field images as being spatially displaced, as shown in FIG. 5*b,* no appreciable color differences occur between temporally successive field images. Consequently, the color video picture display apparatus can display high-definition full color video pictures on single display device 1 according to the field sequential process while preventing the observer from visually recognizing color breakups.

Figure 8:
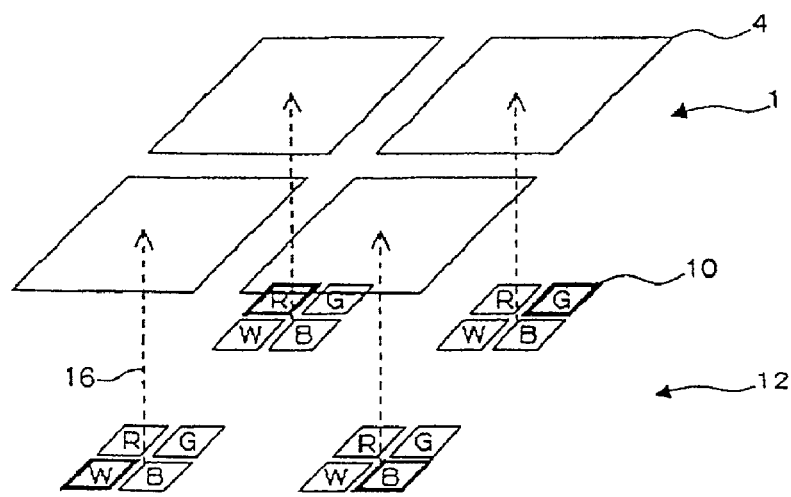
FIGS. 8 through 10 are partially enlarged perspective views of an arrangement of a display device and a color switching illumination unit according to a fourth embodiment of the present invention.
Figure 9:
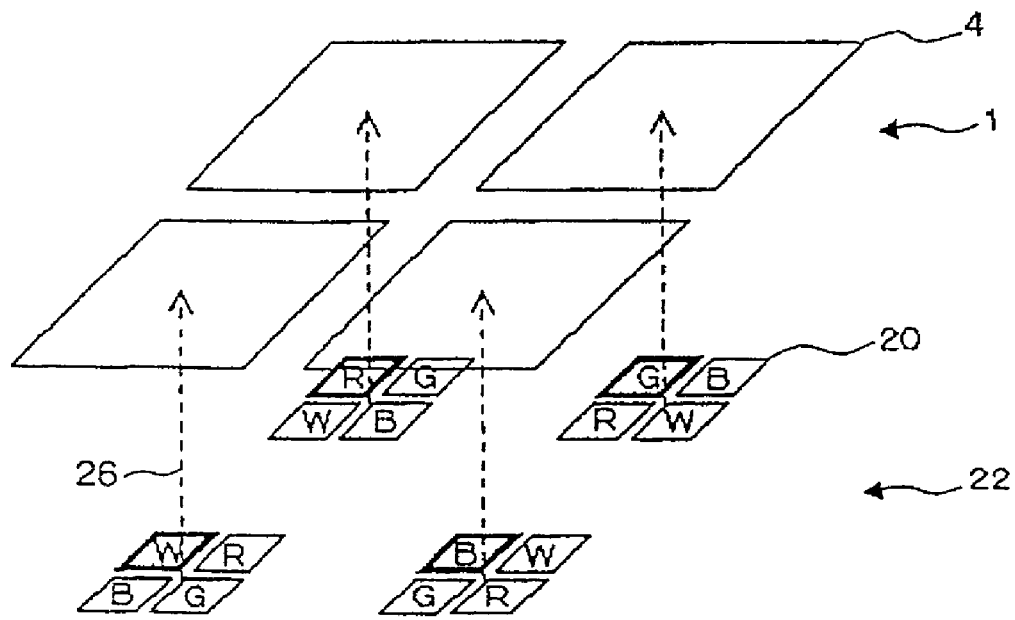
Figure 10:
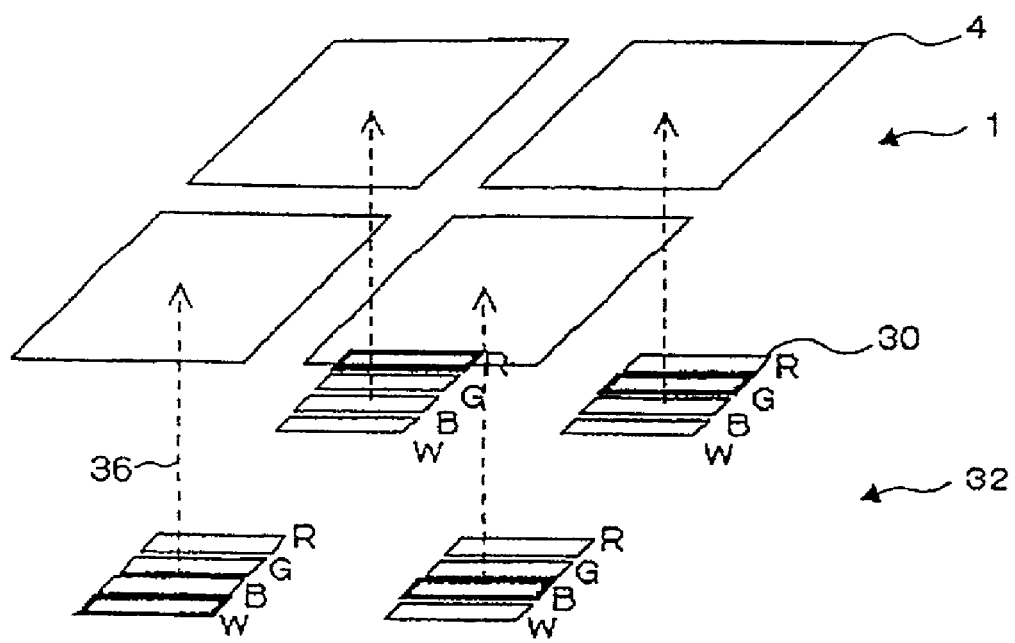

4th Embodiment:

Color switching illumination units according to a fourth embodiment which are applicable to the second and third embodiments will be described below. FIGS. 8, 9, and 10 show, in partial enlarged perspective, display devices 1 and color switching illumination units 12, 22, 32, respectively.

In FIG. 8, color switching illumination unit 12 produces illuminating lights 16 including a red illuminating light, a green illuminating light, a blue illuminating light, and an achromatic (white) illuminating light. A set of adjacent four pixels in the matrix of pixels of display device 1 is handled as a unit in the form of a square matrix, and color switching illumination unit 12 is arranged such that the colors of illuminating lights 16 applied from color switching illumination unit 12 to those pixels are different from each other and are switched or changed in each field period. In FIG. 8, elements for emitting lights in the respective colors are disposed in each of the pixels. Specifically, LEDs for emitting lights in the colors R, G, B, W in each of pixels 4 of display device 1 are grouped as light-emitting regions 10, which are arranged in a matrix and energized by control device 8. The light-emitting elements may comprise EL elements or FED elements. Illuminating device 7 other than the elements for emitting lights in the respective colors are disposed in each of the pixels and may comprise an arrangement of color filters and switching elements for selecting colors of lights to pass therethrough from white light, or an arrangement of light guides such as optical fibers.

The arrangement of color filters and switching elements may be identical to a conventional color liquid crystal display unit. R, G, B, W microcolor filters are disposed in each of pixels 4 arranged in a matrix, and a liquid crystal effects intensity modulation to pass either one of the lights of the colors R, G, B, W of white light from a backlight unit. Since the arrangement of color filters and switching elements is used as the illuminating device, it is not necessary to independently control the intermediate tones of the respective pixels as is the case with images, but one scanning line, plural scanning lines, or an entire displayed image may be turned on or off for each of the colors such that the colors of illuminating lights applied to the pixels are switched for each unit of pixels or each field period.

The arrangement of light guides may comprise a bundle of as many optical fibers as the number of light-emitting regions 10, with one ends aligned with the respective light-emitting regions and the other ends divided depending on the sequence of light emission and the arrangement of the pixels. The colors of lights applied to the divided groups of optical fibers and the times at which the lights are applied to the divided groups of optical fibers are controlled by a control device.

In FIG. 8, the colors R, G, B, W in each of light-emitting regions 10 are arranged such that the color R is in an upper left position, the color G in an upper right position, the color B in a lower right position, and the color W in a lower left position. However, in color switching illumination unit 22 shown in FIG. 9, the colors R, G, B, W in each of light-emitting regions 20 are arranged such that the colors in a lower left position, in an upper left position, in an upper right position, and in a lower right position, correspond to a sequence of colors to be emitted in first, second, third, and fourth fields, respectively. Furthermore, as shown in FIG. 10, color switching illumination unit 32 has light-emitting regions 30 whose colors R, G, B, W are arranged in strips extending in the direction of rows or columns.

If display devices 1 and light-emitting regions 10, 20, 30 are widely spaced from each other, then pixels 4 and the colors of illuminating lights 16, 26, 36 will not correspond to each other due to parallax. Therefore, display devices 1 and light-emitting regions 10, 20, 30 should preferably be positioned highly closely to each other or be integrally formed with each other. Alternatively, a focusing means such as an optical system comprising lenses may be used to cause pixels 4 and the colors of illuminating lights 16, 26, 36 to correspond to each other.

The color video picture display apparatus with color switching illumination units 12, 22, 32 can display high-definition full color video pictures on single display device 1 according to the field sequential process while preventing the observer from visually recognizing color breakups.

5th Embodiment:

A color switching illumination unit according to a fifth embodiment which is applicable to the second and third embodiments will be described below.

Figure 11:
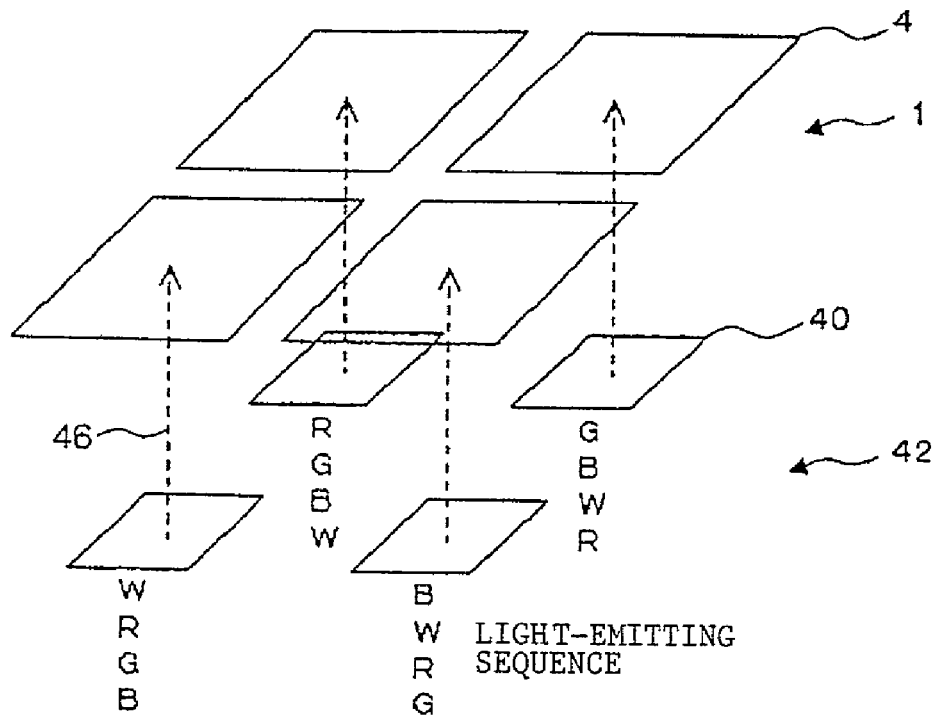
FIG. 11 is a partially enlarged perspective view of an arrangement of a display device and a color switching illumination unit according to a fifth embodiment of the present invention.

FIG. 11 shows, in partial enlarged perspective, display device 1 and color switching illumination unit 42 according to the fifth embodiment. Color switching illumination unit 42 has a plurality of light-emitting regions 40 each associated with one pixel 4 of display device 1 for emitting illuminating light 46 which is either a red illuminating light, a green illuminating light, a blue illuminating light, or an achromatic illuminating light. A set of adjacent four pixels in the matrix of pixels of display device 1 is handled as a unit, and color switching illumination unit 42 is arranged such that the colors of illuminating lights 46 applied from color switching illumination unit 42 to those pixels are different from each other and are switched or changed in each field period. In FIG. 11, the colors are switched successively in the sequence of R, G, B, W for the upper left pixel, in the sequence of G, B, W, R for the upper right pixel, in the sequence of B, W, R, G for the lower right pixel, and in the sequence of W, R, G, B for the lower left pixel. In FIG.

11, electronic color filters for selecting the colors of lights to pass therethrough from white light are associated with each of pixels 4. The electronic color filters operate based on the wavelength-depending dispersion of the birefringence of liquid crystals, and controls the voltage applied to liquid crystal cells disposed between polarizers to change the colors of lights that pass through the liquid crystal cells. Alternatively, the electronic color filters may comprise a combination of color polarizers and a liquid crystal, a holographic device having a liquid crystal and a polymer, or electronic color filters based on the selective reflection by a cholesteric liquid crystal. A control device applies a voltage to these electronic color filters to change the colors-of lights passing through the electronic color filters for each of pixels 4. White light may be produced by a backlight unit comprising a fluorescent lamp or a white light source comprising an LED or an EL unit. If a high-luminance light source is required for projecting video pictures, then a light source such as a halogen lamp, a metal halide lamp, a xenon lamp, a high-pressure mercury lamp, or the like may be employed. If a filter is added immediately downstream of the lamp to remove wavelength components not required by the display apparatus, i.e., an ultraviolet ray and an infrared ray, then the components downstream of the lamp are prevented from being degraded by chemical changes and temperature rises.

Color switching illumination unit 42 other than the above arrangement using the electronic filters may comprise an arrangement of light guides such as optical fibers. The arrangement of light guides may comprise a bundle of as many optical fibers as the number of pixels, with one ends thereof aligned with the respective light-emitting regions and the other ends thereof divided into four groups depending on the sequence of light emission and the arrangement of the pixels. The colors of lights applied to the four divided groups of optical fibers are controlled by a control device, using a white light source and color filters.

The color video picture display apparatus with color switching illumination unit 42 can display high-definition full color video pictures on single display device 1 according to the field sequential process while preventing the observer from visually recognizing color breakups.

6th Embodiment:

A color switching illumination unit according to a sixth embodiment which is applicable to the second and third embodiments will be described below.

Figure 12:
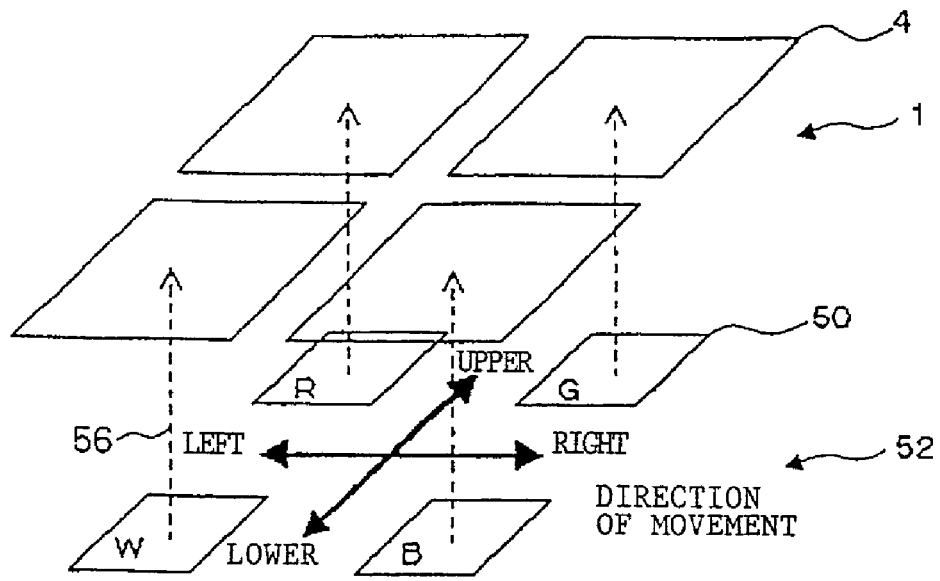
FIG. 12 is a partially enlarged perspective view of an arrangement of a display device and a color switching illumination unit according to a sixth embodiment of the present invention.

FIG. 12 shows, in partially enlarged perspective, display device 1 and color switching illumination unit 52 according to the sixth embodiment. Color switching illumination unit 52 has a plurality of light-emitting regions 50 each associated with one pixel 4 of display device 1 for emitting illuminating light 56 which is either a red illuminating light, a green illuminating light, a blue illuminating light, or an achromatic illuminating light. A set of adjacent four pixels in the matrix of pixels of display device 1 is handled as a unit, and the colors of illuminating lights 56 applied from color switching illumination unit 52 to pixels 4 are different from each other. Color switching illumination unit 52 also has a moving means for moving the relative position of color switching illumination unit 52 and display device 1 by one pixel in each field period. In FIG. 12, each of light-emitting regions 50 comprises an LED for emitting one of the lights having the colors R, G, B, W, and the moving means comprises a piezoelectric actuator coupled to color switching illumination unit 52.

The actuator is arranged to move color switching illumination unit 52 by one pixel in the direction of rows, i.e., in the horizontal direction, in the direction of columns, i.e., in the vertical direction, and in the matrix of pixels 4 of display device 1. For example, the actuator moves color switching illumination unit 52 repeatedly rightward, upward, leftward, and downward in respective field periods, for thereby applying different colors of illuminating lights 56 to pixels 4, four of which are handled as a unit, and switching the colors in respective field periods.

The illuminating device may comprise a combination of light-emitting elements other than LEDs, a backlight unit, and color filters, or light guides such as optical fibers. Color switching illumination unit 52 should preferably have one or more extra arrays of light-emitting regions 50 in each of upward, downward, leftward, and rightward directions with respect to the number of pixels 4 of display device 1 such that when color switching illumination unit 52 is moved, the outermost array of pixels 4 on display device 1 will remain illuminated by color switching illumination unit 52.

The color video picture display apparatus with color switching illumination unit 52 can display high-definition full color video pictures on single display device 1 according to the field sequential process while preventing the observer from visually recognizing color breakups.

Figure 13:
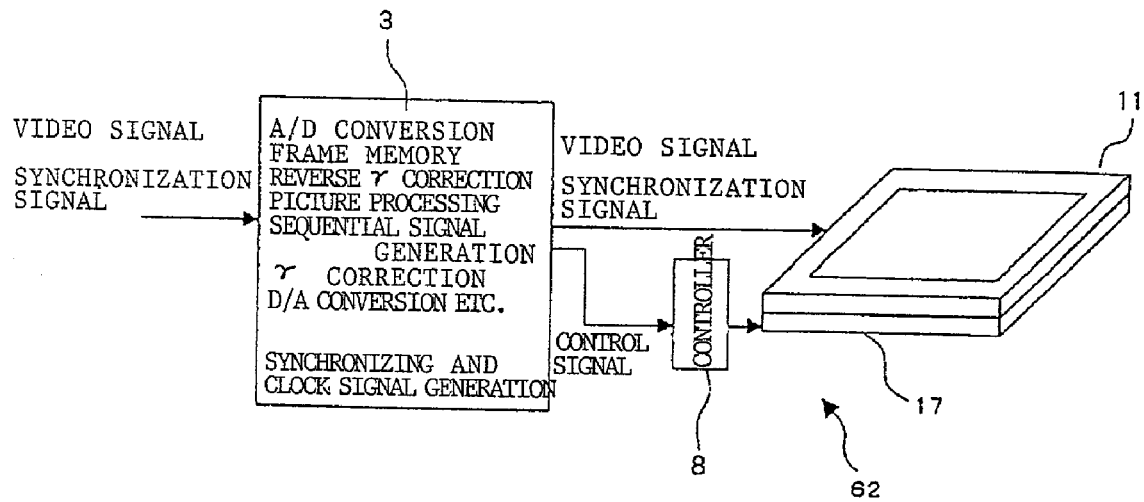
FIG. 13 is a view, partly in block form, showing a color video picture display apparatus according to a seventh embodiment of the present invention.

7th Embodiment:

FIG. 13 shows, partially in block form, a color video picture display apparatus according to a seventh embodiment of the present invention. As shown in FIG. 13, the color video picture display apparatus comprises display device 11, color switching illumination unit 62, and video signal processor 3. Video signal processor 3 of the color video picture display apparatus according to the seventh embodiment is identical to video signal processor 3 of the color video picture display apparatus according to the second embodiment, and display device 11 and color switching illumination unit 62 of the color video picture display apparatus according to the seventh embodiment are different from those of the color video picture display apparatus according to the second embodiment.

Figure 14:
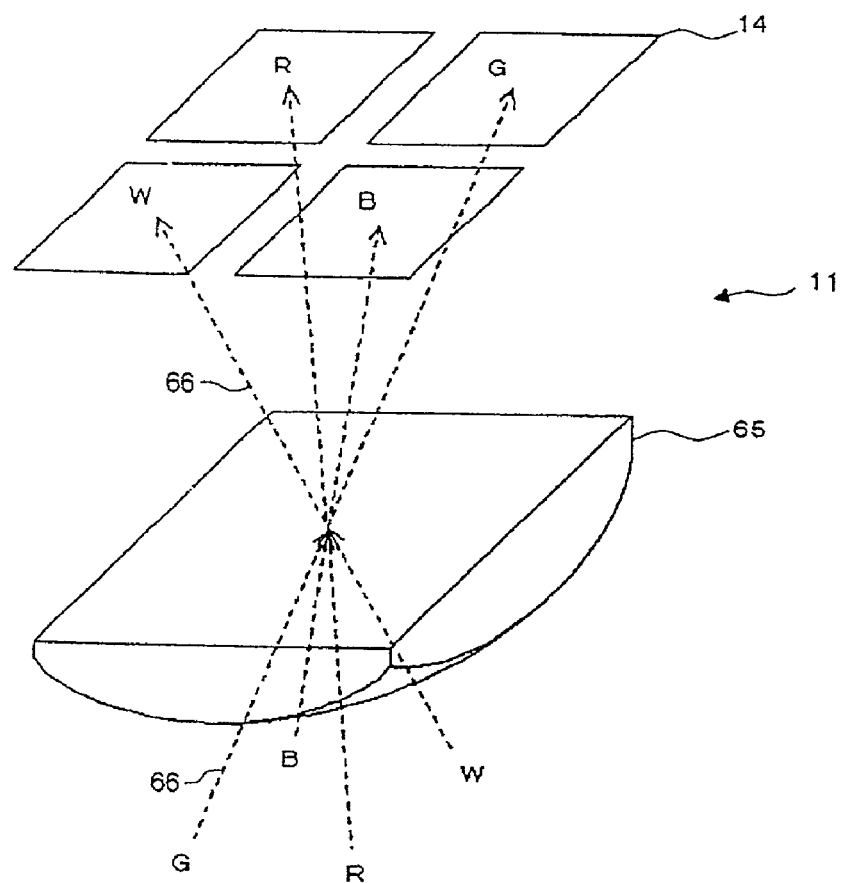
FIG. 14 is a partially enlarged perspective view of an arrangement of a color switching illumination unit according to the seventh embodiment of the present invention.

FIG. 14 shows, in partially enlarged perspective, an illuminating light incident surface of display device 11. Display device 11 has a plurality of condensing lenses 65 each for four pixels 14 thereof, disposed on the surface to which illuminating lights 66 are applied. The distance between condensing lens 65 and pixels 14 is equal to the focal length of condensing lens 65. Illuminating lights 66 include a red illuminating light, a green illuminating light, a blue illuminating light, and an achromatic illuminating light. Illuminating light are applied from color switching illumination unit 62 to condensing lens 65 at different incident angles, and the colors of illuminating lights 66 are switched or changed in each field period. If the focal length of condensing lens 65 is represented by f1 and the incident angle at which the illuminating lights are applied to condensing lens 65 is represented by $\theta 1$, then illuminating lights 66 are focused on the focusing plane of condensing lens 65 at a position spaced from the optical axis of condensing lens 65 by a distance of $f1 \cdot \tan \theta 1$. Therefore, when the red illuminating light, the green illuminating light, the blue illuminating light, and the achromatic illuminating light are applied to condensing lens 65 at respective different incident angles, illuminating lights 66 can illuminate different pixels 14, respectively. When the colors of illuminating lights 66 are switched in each field period, the colors of illuminating lights 66 applied to pixels 14 are switched in each field period.

Illuminating lights 66 do not need to be completely collimated, but may be applied in an angular range which allows illuminating lights 66 to be applied to desired pixels 14. The distance between condensing lens 65 and pixels 14 is not required to be equal to the focal length of condensing lens 65, but may be nearly equal to the focal length of condensing lens 65 insofar as illuminating lights 66 can be separated toward respective pixels 14.

Condensing lenses 65 are arranged in a matrix of condensing lenses each having an aperture corresponding to four pixels, and are in the form of a glass substrate etched into curved surfaces. Alternatively, condensing lenses 65 may comprise a glass substrate having a distribution of refractive indexes produced by an ion exchange process, a photosensitive resin body that is patterned and thermally deformed, a mechanically machined lens assembly, a combination of diffraction gratings or holograms, a printed lens assembly, or a glass substrate having a lens configuration transferred from a mold.

Four pixels of a unit may be arranged in strips extending the direction of rows or columns, rather than a square pattern as shown. Four pixels of a unit may also be arranged in strips that are staggered by one-half of a pixel in each row. However, the square matrix of pixels which allows illuminating lights of respective colors to be applied at equal incident angles to the condensing lens is advantageous in that the angle of field of the displayed images is symmetrical and a better match is achieved between the array of pixels and the layout of condensing lenses.

The color video picture display apparatus shown in FIG. 14 is capable of producing displayed image 6 shown in FIG. 4. Even if the observer abruptly moves the line of sight horizontally, seeing the field images as being spatially displaced, as shown in FIG. 5b, no appreciable color differences occur between temporally successive field images. Consequently, the color video picture display apparatus can display high-definition full color video pictures on single display device 1 according to the field sequential process while preventing the observer from visually recognizing color breakups.

Figure 15:
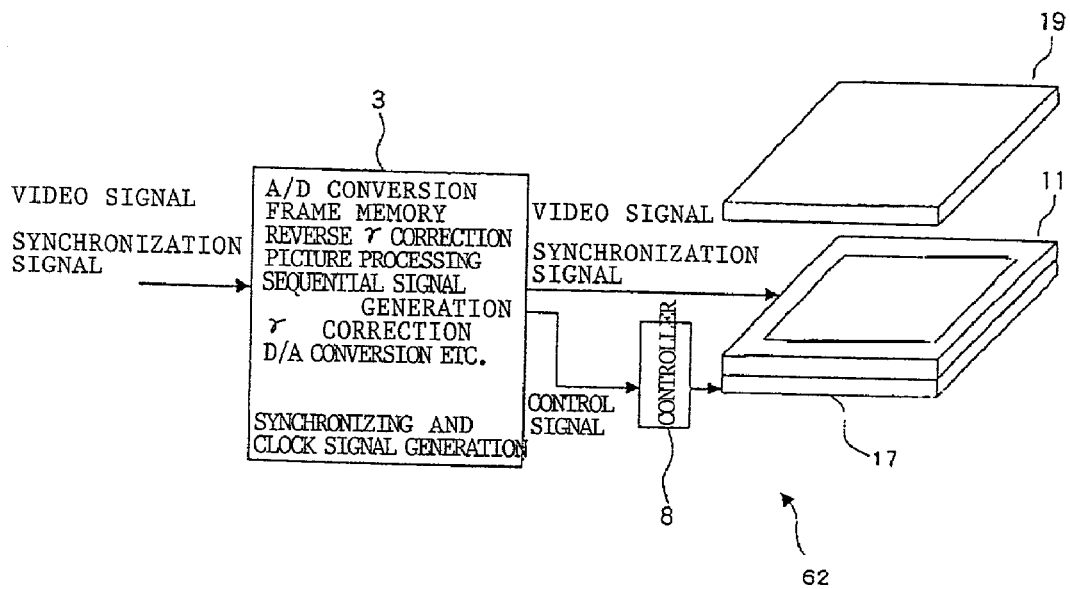
FIG. 15 is a view, partly in block form, showing a color video picture display apparatus according to an eighth embodiment of the present invention.

8th Embodiment:

FIG. 15 shows, partially in block form, a color video picture display apparatus according to an eighth embodiment of the present invention. As shown in FIG. 15, the color video picture display apparatus comprises display device 11, color switching illumination unit 62, video signal processor 3, and projecting unit 19. Display device 11, video signal processor 3, and color switching illumination unit 62 of the color video picture display apparatus according to the eighth embodiment are identical to those of the color video picture display apparatus according to the seventh embodiment. The color video picture display apparatus according to the eighth embodiment differs from the color video picture display apparatus according to the seventh embodiment in that it additionally has projecting unit 19 for projecting video pictures displayed on display device 11.

As with the third embodiment, projecting unit 19 is a projection lens assembly comprising a plurality of lenses for projecting a video picture displayed on display device 11 onto a screen, not shown, at an enlarged scale. Since the illuminating lights from color switching illumination unit 62 are applied in a wide angle, they will not be projected if the projection lens assembly has a large F-number. With a large F-number, a sufficient level of brightness cannot be achieved on the screen, and the problem of irregular brightness and chromaticity of projected images occurs. Therefore, the projection lens assembly should have a small F-number for projecting the illuminating lights applied in a wide angle. A square matrix of pixels in each unit of display device 11 which allow illuminating lights of respective colors to be applied at equal incident angles to the condensing lens is advantageous in that the incident angle upon the projection lens assembly is symmetrical and the problem of irregular brightness and chromaticity resulting from an optical loss (vignetting) caused by the projection lens assembly is avoided.

The projection lens assembly should preferably be corrected sufficiently for magnification and chromatic aberration for projecting video pictures displayed on display device 11 clearly without distortions. If not corrected sufficiently, the positions of R, G, B, W pixels would be displaced on the screen. The projection lens assembly has a focus adjusting mechanism for focusing the displayed video picture at a desired position on the screen, and a zoom mechanism for enlarging the size of the displayed video picture to a desired size on the screen. Projecting unit 19 may additionally include a mirror for bending the path of the projected light.

Projecting unit 19 is not limited to the projection lens assembly, but may comprise a plurality of spherical or aspherical mirrors for projecting video pictures. Such spherical or aspherical mirrors are advantageous in that they do not cause chromatic aberration which would result from a wavelength-depending dispersion of the refractive indexes of lenses. Alternatively, projecting unit 19 may comprise a combination of lenses and mirrors or a combination of optical parts such as prisms and holograms.

Projecting unit 19 may also comprise an arrangement for projecting images through lenses and mirrors, i.e., an arrangement for projecting images onto the retina, other than the above arrangement for projecting images onto the screen. For example, the present embodiment is applicable to a head-mounted display unit, a wearable display unit, or a unit for observing at an enlarged scale images produced by a portable device.

The color video picture display apparatus shown in FIG. 15 is capable of producing displayed image 6 shown in FIG. 4. Even if the observer abruptly moves the line of sight horizontally, seeing the field images as being spatially displaced, as shown in FIG. 5b, no appreciable color differences occur between temporally successive field images. Consequently, the-color video picture display apparatus can display high-definition full color video pictures on single display device 1 according to the field sequential process while preventing the observer from visually recognizing color breakups.

9th Embodiment:

A color switching illumination unit according to a ninth embodiment which is applicable to the seventh and eighth embodiments will be described below.

Figure 16:
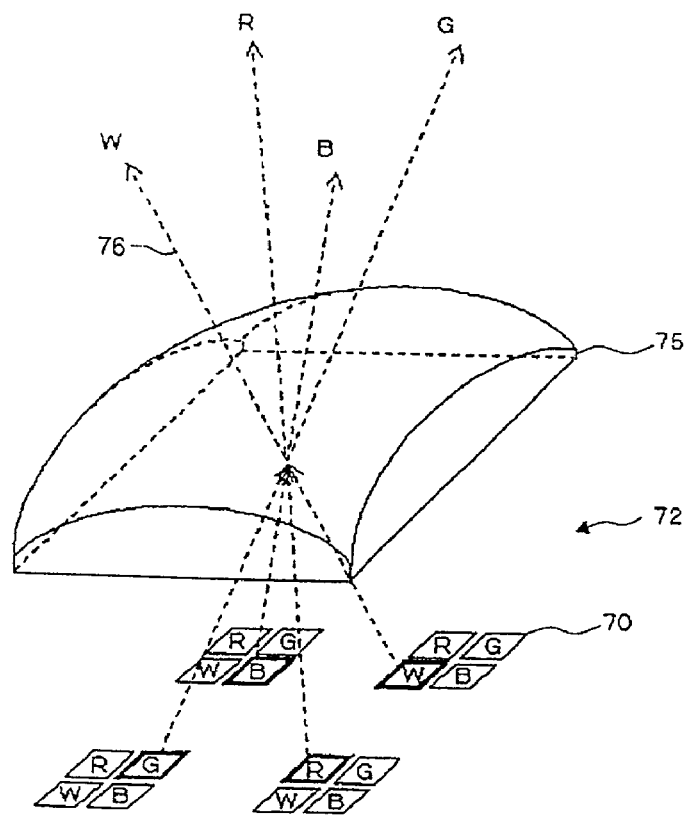
FIG. 16 is a partially enlarged perspective view of an arrangement of a color switching illumination unit according to a ninth embodiment of the present invention.

FIG. 16 shows, in partially enlarged perspective, color switching illumination unit 72 according to the ninth embodiment. Color switching illumination unit 72 comprises collimator lens 75 and four sets of four light-emitting regions 70 for emitting a red illuminating light, a green illuminating light, a blue illuminating light, and an achromatic illuminating light. The distance between collimator lens 75 and light-emitting regions 70 is equal to the focal length of collimator lens 75. Four light-emitting regions 70 are arranged such that only one of them emits illuminating light 76 in each field period, the colors of illuminating lights 76 from the four sets are different from each other, and the colors of illuminating lights 76 are switched in each field period. If the focal length of collimator lens 75 is represented by f2 and the distance from the optical axis of collimator lens 75 to light-emitting regions 70 is represented by d, then the lights exit from collimator lens 75 at an angle θ2 which satisfies the equation d=f2·tan θ2. Therefore, the red illuminating light, the green illuminating light, the blue illuminating light, and the achromatic illuminating light exit from collimator lens 75 at corresponding exit angles, and the colors of illuminating lights 76 are switched in each field period.

If the angle θ1 at which illuminating lights 76 are applied to condensing lens 65 and the angle θ2 at which illuminating lights 76 exit from collimator lens 75 are equal to each other, then the colors of illuminating lights 76, which include the red illuminating light, the green illuminating light, the blue illuminating light, and the achromatic illuminating light, applied to the pixels 64 arranged in a matrix of the display device 11, with four adjacent pixels handled as a unit, are different from each other, and the colors of illuminating lights 76 are switched in each field period.

Illuminating lights 76 exit from collimator lens 75 at different angles depending on the area of light-emitting regions 70. If the area of light-emitting regions 70 is small with respect to the focal length of collimator lens 75, then it is possible to obtain illuminating lights 76 in a desired angle. The distance between collimator lens 75 and light-emitting regions 70 is not required to be equal to the focal length of collimator lens 75, but may be nearly equal to the focal length of collimator lens 75 insofar as the angles of illuminating lights 76 fall in a desired angular range.

The distance between collimator lens 75 and condensing lens 65 is not limited to any particular value. However, illuminating lights 76 which exit from collimator lens 76 have a certain angle, so that they become spatially separate from each other as they travel away from collimator lens 76. Since the colors of illuminating lights 76 need to exist when they are applied to display device 11, the distance between collimator lens 75 and condensing lens 65 should preferably be small.

The light-emitting elements may comprise LEDs, EL elements or FED elements, or may comprise an arrangement of color filters and switching elements for selecting colors of lights to pass therethrough from white light, or an arrangement of light guides such as optical fibers, as described above.

Collimator lens 76 comprises a lens polished from a glass blank. However, collimator lens 76 may be a molded lens or a Fresnel lens. Collimator lens 76 may have a spherical or aspherical lens configuration, or may comprise a plurality of lenses to correct chromatic aberration and other aberrations.

The color video picture display apparatus with color switching illumination unit 72 can display high-definition full color video pictures on single display device 1 according to the field sequential process while preventing the observer from visually recognizing color breakups.

10th Embodiment:

A color switching illumination unit according to a tenth embodiment which is applicable to the seventh and eighth embodiments will be described below.

Figure 17:
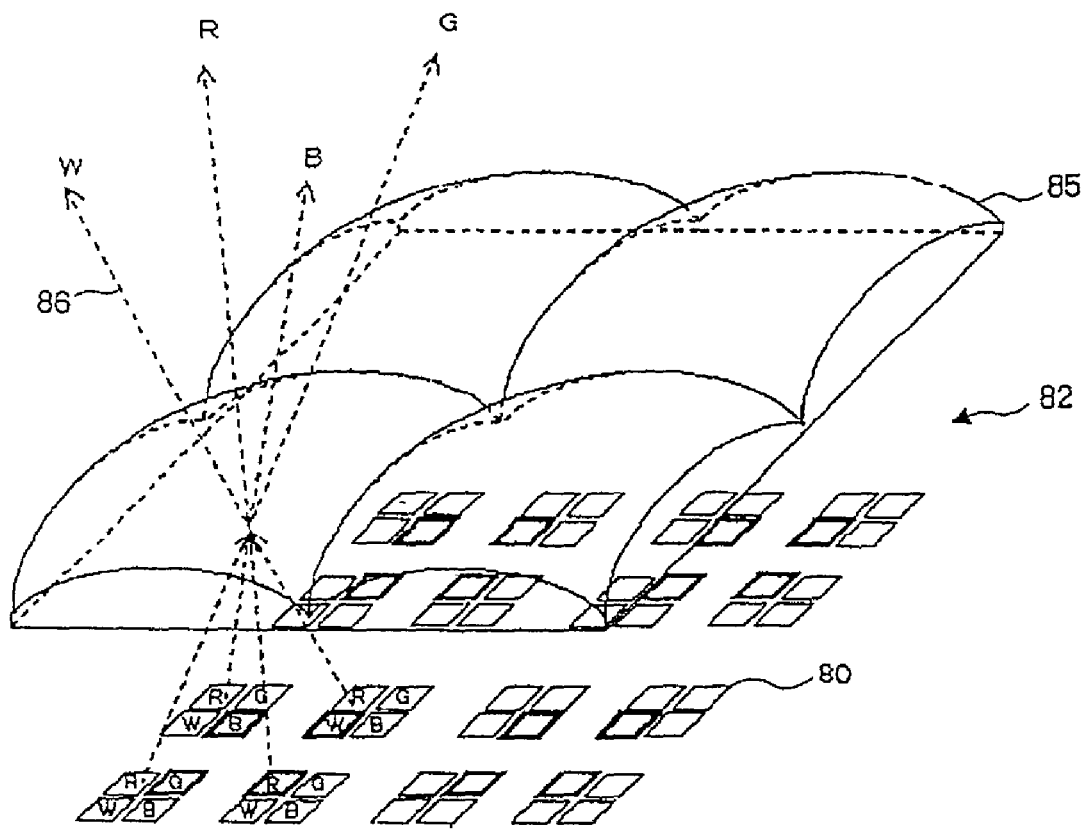
FIG. 17 is a partially enlarged perspective view of an arrangement of a color switching illumination unit according to a tenth embodiment of the present invention.

FIG. 17 shows, in partially enlarged perspective, color switching illumination unit 82 according to the tenth embodiment. Color switching illumination unit 82 comprises four collimator lenses 85 and four sets of four light-emitting regions 80 for emitting a red illuminating light, a green illuminating light, a blue illuminating light, and an achromatic illuminating light to each of collimator lenses 85. The distance between collimator lenses 85 and light-emitting regions 80 is equal to the focal length of collimator lenses 85. Four light-emitting regions 80 are arranged such that only one of them emits illuminating light 86 in each field period, the colors of illuminating lights 86 from the four sets are different from each other, and the colors of illuminating lights 86 are switched in each field period. If the focal length of collimator lenses 85 is represented by f2 and the distance from the optical axes of collimator lenses 85 to light-emitting regions 80 is represented by d, then the lights exit from collimator lenses 85 at an angle θ2 which satisfies the equation d=f2·tan θ2. Therefore, the red illuminating light, the green illuminating light, the blue illuminating light, and the achromatic illuminating light exit from collimator lenses 85 at corresponding exit angles, and the colors of illuminating lights 86 are switched in each field period.

Illuminating lights 86 exit from collimator lenses 85 at different angles depending on the area of light-emitting regions 80. If the area of light-emitting regions 80 is small with respect to the focal length of collimator lenses 85, then it is possible to obtain illuminating lights 86 in a desired angle. The distance between collimator lenses 85 and light-emitting regions 80 is not required to be equal to the focal length of collimator lenses 85, but may be nearly equal to the focal length of collimator lenses 85 insofar as the angles of illuminating lights 86 fall in a desired angular range.

The light-emitting elements may comprise LEDs, EL elements or FED elements, or may comprise an arrangement of color filters and switching elements for selecting colors of lights to pass therethrough from white light, or an arrangement of light guides such as optical fibers, as described above with respect to the fourth embodiment.

Collimator lenses 85 comprise four lenses polished from a glass blank and bonded together. However, collimator lenses 85 may be molded lenses or a Fresnel lens. Collimator lenses 85 may have a spherical or aspherical lens configuration, or may comprise a plurality of lenses arranged along the optical axis to correct chromatic aberration and other aberrations.

If the angle θ1 at which illuminating lights 86 are applied to condensing lens 65 and the angle θ2 at which illuminating lights 86 exit from collimator lenses 85 are equal to each other, then the colors of illuminating lights 86, which include the red illuminating light, the green illuminating light, the blue illuminating light, and the achromatic illuminating light, applied to the pixels 64 arranged in a matrix of display device 11, with four adjacent pixels handled as a unit, are different from each other, and the colors of illuminating lights 86 are switched in each field period.

The color video picture display apparatus with color switching illumination unit 82 can display high-definition full color video pictures on single display device 1 according to the field sequential process while preventing the observer from visually recognizing color breakups.

While the arrangement which has the four sets of collimator lenses 85 and light-emitting regions 80 has been described above, the color switching illumination unit may have more sets of collimator lenses 85 and light-emitting regions 80. As more sets of collimator lenses 85 and light-emitting regions 80 are employed, the length of the color switching illumination unit along the optical axis is reduced, and hence the color switching illumination unit is constructed in a low profile.

11th Embodiment:

A color switching illumination unit according to an eleventh embodiment which is applicable to the seventh and eighth embodiments will be described below.

Figure 18:
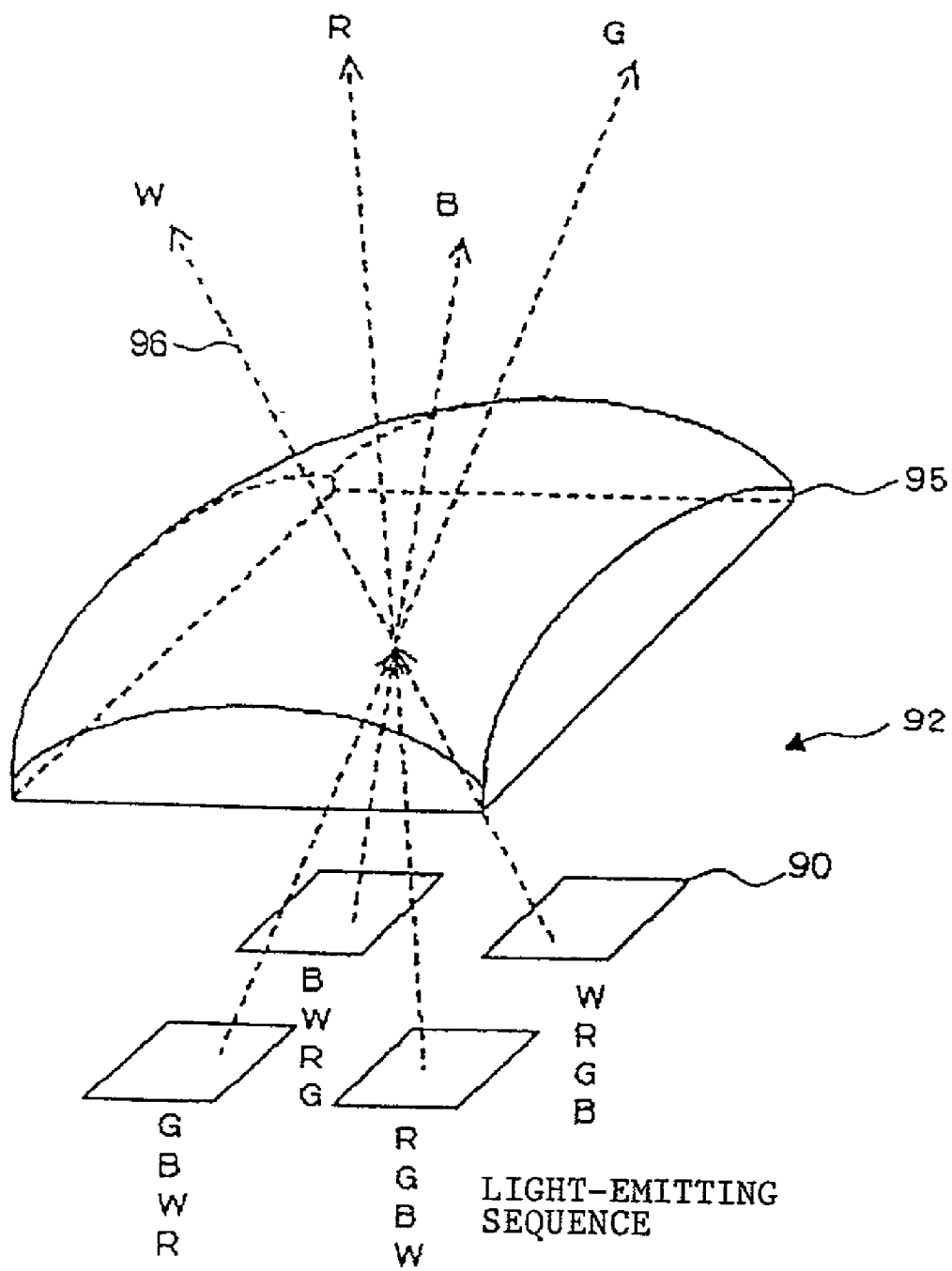
FIG. 18 is a partially enlarged perspective view of an arrangement of a color switching illumination unit according to an eleventh embodiment of the present invention.

FIG. 18 shows, in partially enlarged perspective, color switching illumination unit 92 according to the eleventh embodiment. Color switching illumination unit 92 comprises collimator lens 95 and four sets of four light-emitting regions 90 for emitting a red illuminating light, a green illuminating light, a blue illuminating light, and an achromatic illuminating light to collimator lens 95. The distance between collimator lens 95 and light-emitting regions 90 is equal to the focal length of collimator lens 95. Four light-emitting regions 90 are arranged such that the colors of illuminating lights 96 from the four sets are different from each other, and the colors of illuminating lights 96 are switched in each field period. If the focal length of collimator lens 95 is represented by f2 and the distance from the optical axis of collimator lens 95 to light-emitting regions 90 is represented by d, then the lights exit from collimator lens 95 at an angle θ2 which satisfies the equation d=f2·tan θ2. Therefore, the red illuminating light, the green illuminating light, the blue illuminating light, and the achromatic illuminating light exit from collimator lens 95 at corresponding exit angles, and the colors of illuminating lights 96 are switched in each field period.

Illuminating lights 96 exit from collimator lens 95 at different angles depending on the area of light-emitting regions 90. If the area of light-emitting regions 90 is small with respect to the focal length of collimator lens 95, then it is possible to obtain illuminating lights 96 in a desired angle. The distance between collimator lens 95 and light-emitting regions 90 is not required to be equal to the focal length of collimator lens 95, but may be nearly equal to the focal length of collimator lens 95 insofar as the angles of illuminating lights 96 fall in a desired angular range.

Electronic color filters for selecting the colors of lights to pass therethrough from white light are associated with each of light-emitting regions 90. The electronic color filters may be identical to those described in the fifth embodiment. While white light may be produced by a backlight unit comprising a fluorescent lamp, it may be produced by a white light source comprising an LED or an EL unit. If a high-luminance light source is required for projecting video pictures, then a light source such as a halogen lamp, a metal halide lamp, a xenon lamp, a high-pressure mercury lamp, or the like may be employed. If a filter is added immediately downstream of the lamp to remove wavelength components not required by the display apparatus, i.e., an ultraviolet ray and an infrared ray, then the components downstream of the lamp are prevented from being degraded by chemical changes and temperature rises.

Alternatively, an arrangement of light guides such as optical fibers may also be employed as described above in the fifth embodiment.

If the angle θ1 at which illuminating lights 96 are applied to condensing lens 65 and the angle θ2 at which illuminating lights 96 exit from collimator lenses 95 are equal to each other, then the colors of illuminating lights 96, which include the red illuminating light, the green illuminating light, the blue illuminating light, and the achromatic illuminating light, applied to the pixels 64 arranged in a matrix of display device 11, with four adjacent pixels handled as a unit, are different from each other, and the colors of illuminating lights 96 are switched in each field period.

The color video picture display apparatus with color switching illumination unit 92 can display high-definition full color video pictures on single display device 1 according to the field sequential process while preventing the observer from visually recognizing color breakups.

12th Embodiment:

A color switching illumination unit according to a twelfth embodiment which is applicable to the seventh and eighth embodiments will be described below.

Figure 19:
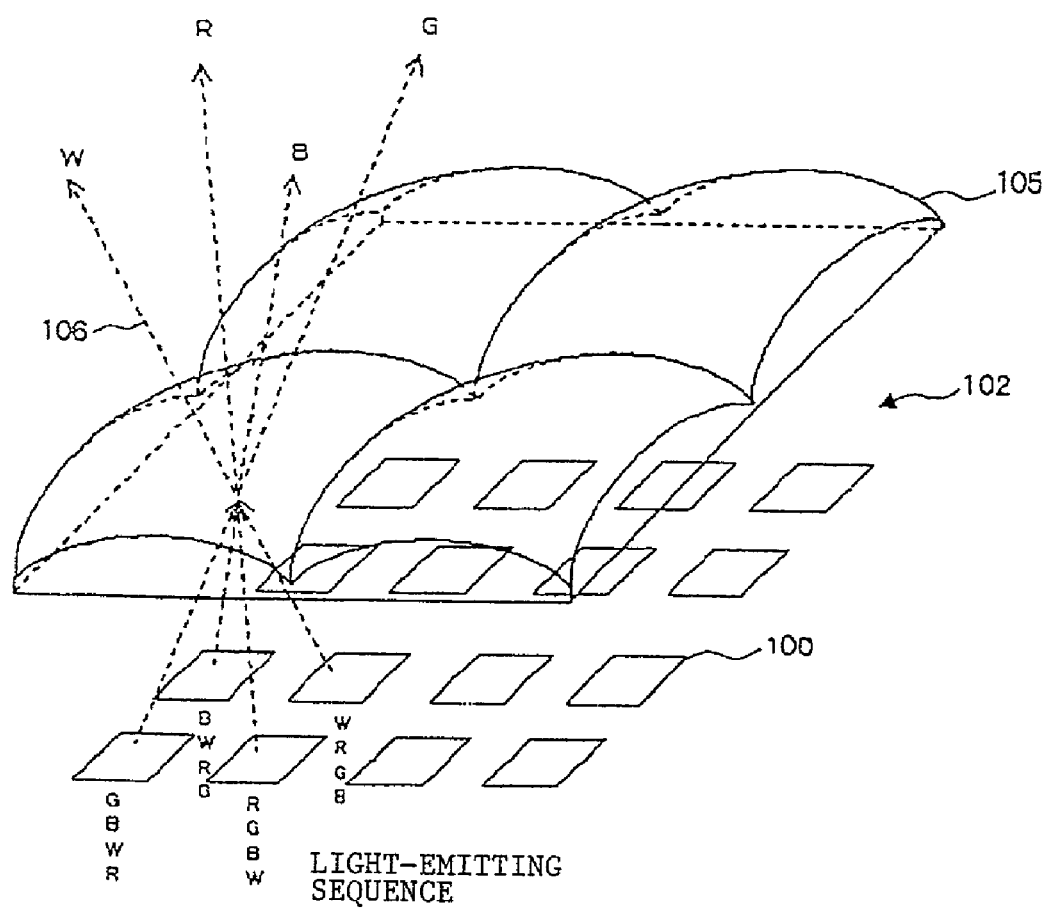
FIG. 19 is a partially enlarged perspective view of an arrangement of a color switching illumination unit according to a twelfth embodiment of the present invention.

FIG. 19 shows, in partially enlarged perspective, color switching illumination unit 102 according to the twelfth embodiment. Color switching illumination unit 102 comprises four collimator lenses 105 and four sets of four light-emitting regions 100 for emitting a red illuminating light, a green illuminating light, a blue illuminating light, and an achromatic illuminating light to each of collimator lenses 105. The distance between collimator lenses 105 and light-emitting regions 100 is equal to the focal length of collimator lenses 105. Four light-emitting regions 100 are arranged such that the colors of illuminating lights 106 from the four sets are different from each other, and the colors of illuminating lights 106 are switched in each field period. If the focal length of collimator lenses 105 is represented by f2 and the distance from the optical axes of collimator lenses 105 to light-emitting regions 100 is represented by d, then the lights exit from collimator lenses 105 at an angle θ2 which satisfies the equation d=f2·tan θ2. Therefore, the red illuminating light, the green illuminating light, the blue illuminating light, and the achromatic illuminating light exit from collimator lenses 105 at corresponding exit angles, and the colors of illuminating lights 106 are switched in each field period.

Illuminating lights 106 exit from collimator lenses 105 at different angles depending on the area of light-emitting regions 100. If the area of light-emitting regions 100 is small with respect to the focal length of collimator lenses 105, then it is possible to obtain illuminating lights 106 in a desired angle. The distance between collimator lenses 105 and light-emitting regions 100 is not required to be equal to the focal length of collimator lenses 105, but may be nearly equal to the focal length of collimator lenses 105 insofar as the angles of illuminating lights 106 fall in a desired angular range.

Electronic color filters for selecting the colors of lights to pass therethrough from white light are associated with each of light-emitting regions 100. The electronic color filters may be identical to those described in the fifth embodiment. While white light may be produced by a backlight unit comprising a fluorescent lamp, it may be produced by a white light source comprising an LED or an EL unit. If a high-luminance light source is required for projecting video pictures, then a light source such as a halogen lamp, a metal halide lamp, a xenon lamp, a high-pressure mercury lamp, or the like may be employed. If a filter is added immediately downstream of the lamp to remove wavelength components not required by the display apparatus, i.e., an ultraviolet ray and an infrared ray, then the components downstream of the lamp are prevented from being degraded by chemical changes and temperature rises.

The electronic color filters may be a combination of components for selecting the colors of light that has passed therethrough or been reflected thereby from white light, so that the reflected lights can be effectively utilized rather than being lost. For example, three layers of holographic liquid crystals for selectively passing and reflecting R, G, B lights to independently control the amounts of R, G, B lights that have passed therethrough or been reflected thereby, and reflecting mirrors are combined to utilize reflected lights as illuminating lights, making it possible to switch the colors of illuminating lights 106 from light-emitting regions 100. This arrangement increases the efficiency of light utilization, allowing the display apparatus to display images of increased luminance or to consume a reduced amount of electric energy.

Alternatively, an arrangement of light guides such as optical fibers may also be employed as described above in the fifth embodiment.

If the angle θ1 at which illuminating lights 106 are applied to condensing lens 65 and the angle θ2 at which illuminating lights 106 exit from collimator lenses 105 are equal to each other, then the colors of illuminating lights 106, which include the red illuminating light, the green illuminating light, the blue illuminating light, and the achromatic illuminating light, applied to the pixels 64 arranged in a matrix of display device 11, with four adjacent pixels handled as a unit, are different from each other, and the colors of illuminating lights 106 are switched in each field period.

The color video picture display apparatus with color switching illumination unit 102 can display high-definition full color video pictures on the single display device according to the field sequential process while preventing the observer from visually recognizing color breakups.

While the arrangement which has the four sets of collimator lenses 105 and light-emitting regions 100 has been described above, the color switching illumination unit may have more sets of collimator lenses 105 and light-emitting regions 100. As more sets of collimator lenses 105 and light-emitting regions 100 are employed, the length of the color switching illumination unit along the optical axis is reduced, and hence the color switching illumination unit is constructed in a low profile.

13th Embodiment:

A color switching illumination unit according to a thirteenth embodiment which is applicable to the seventh and eighth embodiments will be described below.

Figure 20:
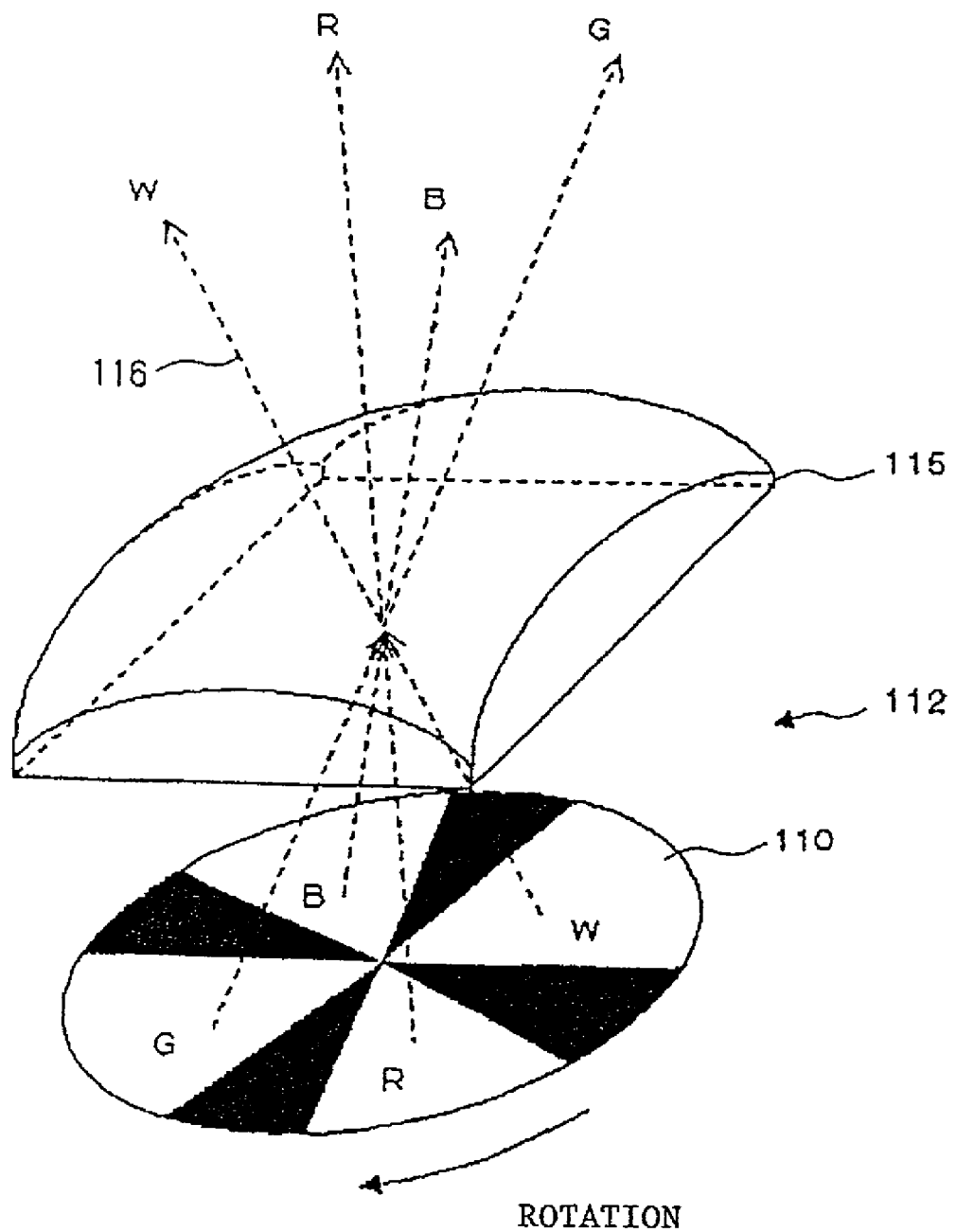
FIG. 20 is a partially enlarged perspective view of an arrangement of a color switching illumination unit according to a thirteenth embodiment of the present invention.

FIG. 20 shows, in partially enlarged perspective, color switching illumination unit 112 according to the thirteenth embodiment. Color switching illumination unit 112 comprises collimator lens 115 and four sets of four light-emitting regions 110 for emitting either one of a red illuminating light, a green illuminating light, a blue illuminating light, and an achromatic illuminating light to collimator lens 115. Color switching illumination unit 112 also has a moving means for moving the relative position of collimator lens 115 and light-emitting regions 110 by a distance corresponding to one light-emitting region in each field period. The distance between collimator lens 115 and light-emitting regions 110 is equal to the focal length of collimator lens 115. If the focal length of collimator lens 115 is represented by f2 and the distance from the optical axis of collimator lens 115 to light-emitting regions 110 is represented by d, then the lights exit from collimator lens 115 at an angle θ2 which satisfies the equation d=f2·tan θ2. Therefore, the red illuminating light, the green illuminating light, the blue illuminating light, and the achromatic illuminating light exit from collimator lens 115 at corresponding exit angles, and the colors of illuminating lights 116 are switched in each field period.

Illuminating lights 116 exit from collimator lens 115 at different angles depending on the area of light-emitting regions 110. If the area of light-emitting regions 110 is small with respect to the focal length of collimator lens 115, then it is possible to obtain illuminating lights 116 in a desired angle. The distance between collimator lens 115 and light-emitting regions 110 is not required to be equal to the focal length of collimator lens 115, but may be nearly equal to the focal length of collimator lens 115 insofar as the angles of illuminating lights 116 fall in a desired angular range.

The moving means is arranged to rotate light-emitting regions 110 to move the relative position of collimator lens 115 and light-emitting regions 110 by a distance corresponding to one light-emitting region in each field period. The moving means comprises a rotating mechanism in the form of a motor connected to light-emitting regions 110.

A disk-shaped color filter assembly comprising a plurality of sectorial color filters for selecting the colors of lights to pass therethrough from white light is associated with light-emitting regions 110. White light may be produced by a high-luminance white light source such as a halogen lamp, a metal halide lamp, a xenon lamp, a high-pressure mercury lamp, or the like. A filter is added immediately downstream of the light source to remove wavelength components not required by the display apparatus, i.e., an ultraviolet ray and an infrared ray, for thereby preventing the display device and other components from being degraded by chemical changes and temperature rises. If lenses are provided for focusing the light ray from the light source respectively onto four light-emitting regions 110 to convert the area of light-emitting regions 110 into an area of desired size, or if a mask having four apertures is provided to limit the area of light-emitting regions 110, then the efficiency of light utilization is increased, and the color reproducibility is also increased.

White light may also be produced by a light-emitting element such as an LED or a light guide such as an optical fiber. Light-emitting elements such as LEDs may be positioned directly in respective light-emitting regions 110.

Rather than rotating the disk-shaped transmissive color filter assembly of sectorial color filters about the optical axis of the collimator lens, there may be employed a disk-shaped transmissive color filter assembly comprising a circumferential array of color filters which is rotated about an axis different from the optical axis of the collimator lens. The disk-shaped transmissive color filter assembly has a portion extending across the collimator lens. Alternatively, the light source may be disposed at the center of a cylindrical color filter assembly, or a reflective color filter assembly may be employed.

If the angle θ1 at which illuminating lights 116 are applied to condensing lens 65 and the angle θ2 at which illuminating lights 116 exit from collimator lenses 115 are equal to each other, then the colors of illuminating lights 116, which include the red illuminating light, the green illuminating light, the blue illuminating light, and the achromatic illuminating light, applied to the pixels 64 arranged in a matrix of display device 11, with four adjacent pixels handled as a unit, are different from each other, and the colors of illuminating lights 106 are switched in each field period.

The color video picture display apparatus with color switching illumination unit 112 can display high-definition full color video pictures on the single display device according to the field sequential process while preventing the observer from visually recognizing color breakups.

While the moving means for rotating light-emitting regions 110 has been described above, it may be replaced with a mechanism having two actuators for translating light-emitting regions 110. Since the relative position of collimator lens 115 and light-emitting regions 110 is required to move a distance corresponding to one light-emitting region 110, collimator means 115 rather than light-emitting regions 110 may be moved or both collimator means 115 and light-emitting regions 110 may be moved.

14th Embodiment:

A color switching illumination unit according to a fourteenth embodiment which is applicable to the seventh and eighth embodiments will be described below.

Figure 21:
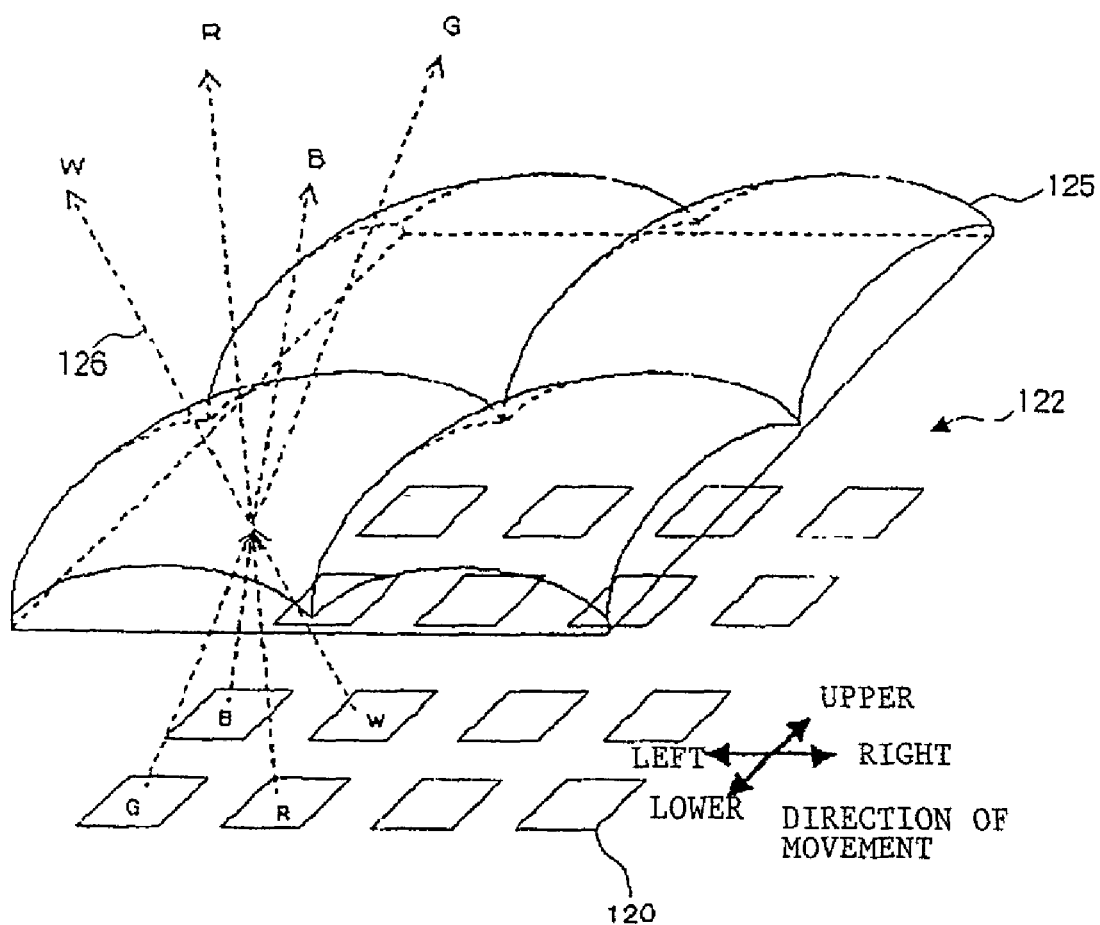
FIG. 21 is a partially enlarged perspective view of an arrangement of a color switching illumination unit according to a fourteenth embodiment of the present invention.

FIG. 21 shows, in partially enlarged perspective, color switching illumination unit 122 according to the fourteenth embodiment. Color switching illumination unit 112 comprises four collimator lenses 125 and four sets of four light-emitting regions 120 for emitting illuminating light 126 which may be either one of a red illuminating light, a green illuminating light, a blue illuminating light, and an achromatic illuminating light to each of collimator lenses 125. The distance between collimator lenses 125 and light-emitting regions 120 is equal to the focal length of collimator lenses 125. Color switching illumination unit 122 also has a moving means for moving the relative position of collimator lenses 125 and light-emitting regions 120 by a distance corresponding to one light-emitting region in each field period. If the focal length of collimator lenses 125 is represented by f2 and the distance from the optical axes of collimator lenses 125 to light-emitting regions 120 is represented by d, then the lights exit from collimator lenses 125 at an angle θ2 which satisfies the equation d=f2·tan θ2. Therefore, the red illuminating light, the green illuminating light, the blue illuminating light, and the achromatic illuminating light exit from collimator lenses 125 at corresponding exit angles, and the colors of illuminating lights 126 are switched in each field period.

Illuminating lights 126 exit from collimator lenses 125 at different angles depending on the area of light-emitting regions 120. If the area of light-emitting regions 120 is small with respect to the focal length of collimator lenses 125, then it is possible to obtain illuminating lights 126 in a desired angle. The distance between collimator lenses 125 and light-emitting regions 120 is not required to be equal to the focal length of collimator lenses 125, but may be nearly equal to the focal length of collimator lenses 125 insofar as the angles of illuminating lights 126 fall in a desired angular range.

In FIG. 21, LEDs for emitting R, G, B, W lights are associated with each of collimator lenses 125. Although not shown, a piezoelectric actuator is connected to color switching illumination unit 122.

The actuator is arranged to move light-emitting regions 120 alternately a distance corresponding to one light-emitting region in the direction of rows, i.e., in the horizontal direction, and in the direction of columns, i.e., in the vertical direction. For example, the actuator moves color switching illumination unit 122 repeatedly rightward, upward, leftward, and downward in respective field periods, for thereby emitting the red illuminating light, the green illuminating light, the blue illuminating light, and the achromatic illuminating light at respective angles from collimator lenses 125, and switching the colors of illuminating lights 126 in respective field periods.

Light-emitting regions 120 may be a combination of light-emitting elements other than LEDs, a backlight unit, and color filters, or light guides such as optical fibers. Color switching illumination unit 122 should preferably have one or more extra arrays of light-emitting regions 120 in each of upward, downward, leftward, and rightward directions with respect to the number of pixels 64 of display device 11 such that when color switching illumination unit 122 is moved, the outermost array of pixels 64 on display device 11 will remain illuminated by color switching illumination unit 122.

If the angle θ1 at which illuminating lights 126 are applied to condensing lens 65 and the angle θ2 at which illuminating lights 126 exit from collimator lenses 125 are equal to each other, then the colors of illuminating lights 126, which include the red illuminating light, the green illuminating light, the blue illuminating light, and the achromatic illuminating light, applied to the pixels 64 arranged in a matrix of display device 11, with four adjacent pixels handled as a unit, are different from each other, and the colors of illuminating lights 126 are switched in each field period.

The color video picture display apparatus with color switching illumination unit 122 can display high-definition full color video pictures on the single display device according to the field sequential process while preventing the observer from visually recognizing color breakups.

While the arrangement which has the four sets of collimator lenses 125 and light-emitting regions 120 has been described above, the color switching illumination unit may have more sets of collimator lenses 125 and light-emitting regions 120. As more sets of collimator lenses 125 and light-emitting regions 120 are employed, the length of the color switching illumination unit along the optical axis is reduced, and hence the color switching illumination unit is constructed in a low profile, and the distance by which the actuator moves color switching illumination unit 122 is reduced.

The mechanism comprising two actuators for translating the color switching illumination unit has been described above. Since the relative position of collimator lens 125 and light-emitting regions 120 is required to move a distance corresponding to one light-emitting region 120, collimator means 125 rather than light-emitting regions 120 may be moved or both collimator means 125 and light-emitting regions 120 may be moved. Instead of mechanically moving light-emitting regions 120 directly, they may be virtually moved using prisms and mirrors.

While preferred embodiments of the present invention have been described using specific terms, such description is for illustrative purposes only, and it is to be understood that changes and variations may be made without departing from the spirit or scope of the following claims.

What is claimed is:

1. A method of displaying a color video picture by sequentially displaying color images on a display device and switching illumination light colors depending on the displayed color images according to a field sequential process, said method comprising the steps of:

illuminating a display device having a matrix of pixels, with adjacent four pixels as a unit, with illuminating lights including a red illuminating light, a green illuminating light, a blue illuminating light, and an achromatic illuminating light, such that the illuminating lights applied to the pixels in each unit have different colors from each other and the colors of the illuminating lights are switched in each field period;

generating a red video signal, a green video signal, a blue video signal, and an achromatic video signal from a color video signal so as to correspond to the colors of the illuminating lights applied to the pixels in each unit; and energizing said display device with the generated video signals to display a color video picture thereon.

2. A method according to claim 1, further comprising the step of:

projecting the color video picture displayed on said display device.

3. A method according to claim 1, wherein the pixels in each unit are arranged in a square matrix with green and achromatic pixels positioned diagonally opposite in relation to each other.

4. A method according to claim 2, wherein the pixels in each unit are arranged in a square matrix with green and achromatic pixels positioned diagonally opposite in relation to each other.

5. An apparatus for displaying a color video picture by sequentially displaying color images on a display device and switching illumination light colors depending on the displayed color images according to a field sequential process, said apparatus comprising:
   a display device having a matrix of pixels;
   color switching illumination means for illuminating said display device, with adjacent four pixels as a unit, with illuminating lights including a red illuminating light, a green illuminating light, a blue illuminating light, and an achromatic illuminating light, such that the illuminating lights applied to the pixels in each unit have different colors from each other and the colors of the illuminating lights are switched in each field period; and
   video signal processing means for generating a red video signal, a green video signal, a blue video signal, and an achromatic video signal from a color video signal so as to correspond to the colors of the illuminating lights applied to the pixels in each unit, and energizing said display device with the generated video signals to display a color video picture thereon.

6. An apparatus according to claim 5, further comprising the step of:
   projecting means for projecting the color video picture displayed on said display device.

7. An apparatus according to claim 5, wherein said color switching illumination means comprises four regions for emitting said red illuminating light, said green illuminating light, said blue illuminating light, and said achromatic illuminating light to each pixel of said display device, with only one at a time of said four regions being energizable to emit the illuminating light in each field period.

8. An apparatus according to claim 6, wherein said color switching illumination means comprises four regions for emitting said red illuminating light, said green illuminating light, said blue illuminating light, and said achromatic illuminating light to each pixel of said display device, with only one at a time of said four regions being energizable to emit the illuminating light in each field period.

9. An apparatus according to claim 5, wherein said color switching illumination means comprises a region for emitting either one of said red illuminating light, said green illuminating light, said blue illuminating light, and said achromatic illuminating light to each pixel of said display device, with the color of said one illuminating light being switchable in each field period.

10. An apparatus according to claim 6, wherein said color switching illumination means comprises a region for emitting either one of said red illuminating light, said green illuminating light, said blue illuminating light, and said achromatic illuminating light to each pixel of said display device, with the color of said one illuminating light being switchable in each field period.

11. An apparatus according to claim 5, wherein said color switching illumination means comprises a region for emitting either one of said red illuminating light, said green illuminating light, said blue illuminating light, and said achromatic illuminating light to each pixel of said display device, and means for moving the relative position of said region and said display device by a distance corresponding to one pixel in each filed period.

12. An apparatus according to claim 6, wherein said color switching illumination means comprises a region for emitting either one of said red illuminating light, said green illuminating light, said blue illuminating light, and said achromatic illuminating light to each pixel of said display device, and means for moving the relative position of said region and said display device by a distance corresponding to one pixel in each field period.

13. An apparatus for displaying a color video picture by sequentially displaying color images on a display device and switching illumination light colors depending on the displayed color images according to a field sequential process, said apparatus comprising:
   a display device having a matrix of pixels and a condensing lens disposed on a surface thereof for applying illuminating light in association with every four pixels of said matrix;
   color switching illumination means for applying illuminating lights including a red illuminating light, a green illuminating light, a blue illuminating light, and an achromatic illuminating light at different angles to said condensing lens, switching the colors of the illuminating lights in each field period, such that, with adjacent four pixels as a unit, the illuminating lights applied to the pixels in each unit have different colors from each other, and switching the colors of the illuminating lights in each field period; and
   video signal processing means for generating a red video signal, a green video signal, a blue video signal, and an achromatic video signal from a color video signal so as to correspond to the colors of the illuminating lights applied to the pixels in each unit, and energizing said display device with the generated video signals to display a color video picture thereon.

14. An apparatus according to claim 13, further comprising the step of:
   projecting means for projecting the color video picture displayed on said display device.

15. An apparatus according to claim 13, wherein said color switching illumination means has a collimator lens associated with four sets of four regions for emitting said red illuminating light, said green illuminating light, said blue illuminating light, and said achromatic illuminating light, respectively, said color switching illumination means being arranged to energize either one at a time of said four regions to emit the illuminating light in each field period.

16. An apparatus according to claim 14, wherein said color switching illumination means has a collimator lens associated with four sets of four regions for emitting said red illuminating light, said green illuminating light, said blue illuminating light, and said achromatic illuminating light, respectively, said color switching illumination means being arranged to energize either one at a time of said four regions to emit the illuminating light in each field period.

17. An apparatus according to claim 13, wherein said color switching illumination means has a collimator lens associated with four sets of four regions for emitting said red illuminating light, said green illuminating light, said blue illuminating light, and said achromatic illuminating light, respectively, said color switching illumination means being arranged to energize either one at a time of said four regions to emit the illuminating light in each field period, said regions being arranged in a matrix.

18. An apparatus according to claim 14, wherein said color switching illumination means has a collimator lens associated with four sets of four regions for emitting said red illuminating light, said green illuminating light, said blue illuminating light, and said achromatic illuminating light, respectively, said color switching illumination means being arranged to energize either one at a time of said four regions to emit the illuminating light in each field period, said regions being arranged in a matrix.

19. An apparatus according to claim 13, wherein said color switching illumination means has a collimator lens associated with four regions for emitting either one at a time of said red illuminating light, said green illuminating light, said blue illuminating light, and said achromatic illuminating light, said color switching illumination means being arranged to switch the colors of the illuminating lights in each field period.

20. An apparatus according to claim 14, wherein said color switching illumination means has a collimator lens associated with four sets of four regions for emitting either one at a time of said red illuminating light, said green illuminating light, said blue illuminating light, and said achromatic illuminating light, said color switching illumination means being arranged to switch the colors of the illuminating lights in each field period.

21. An apparatus according to claim 13, wherein said color switching illumination means has a collimator lens associated with four sets of four regions for emitting either one at a time of said red illuminating light, said green illuminating light, said blue illuminating light, and said achromatic illuminating light, said color switching illumination means being arranged to switch the colors of the illuminating lights in each field period, said regions being arranged in a matrix.

22. An apparatus according to claim 14, wherein said color switching illumination means has a collimator lens associated with four sets of four regions for emitting either one at a time of said red illuminating light, said green illuminating light, said blue illuminating light, and said achromatic illuminating light, said color switching illumination means being arranged to switch the colors of the illuminating lights in each field period, said regions being arranged in a matrix.

23. An apparatus according to claim 13, wherein said color switching illumination means has a collimator lens associated with four sets of four regions for emitting either one at a time of said red illuminating light, said green illuminating light, said blue illuminating light, and said achromatic illuminating light, said color switching illumination means having means for moving the relative position of said collimator lens and said four regions by a distance corresponding to one light-emitting region in each field period.

24. An apparatus according to claim 14, wherein said color switching illumination means has a collimator lens associated with four sets of four regions for emitting either one at a time of said red illuminating light, said green illuminating light, said blue illuminating light, and said achromatic illuminating light, said color switching illumination means having means for moving the relative position of said collimator lens and said four regions by a distance corresponding to one light-emitting region in each field period.

25. An apparatus according to claim 13, wherein said color switching illumination means has a collimator lens associated with four sets of four regions for emitting either one at a time of said red illuminating light, said green illuminating light, said blue illuminating light, and said achromatic illuminating light, said regions being arranged in a matrix, said color switching illumination means having means for moving the relative position of said collimator lens and said four regions by a distance corresponding to one light-emitting region in each field period.

26. An apparatus according to claim 14, wherein said color switching illumination means has a collimator lens associated with four sets of four regions for emitting either one at a time of said red illuminating light, said green illuminating light, said blue illuminating light, and said achromatic illuminating light, said regions being arranged in a matrix, said color switching illumination means having means for moving the relative position of said collimator lens and said four regions by a distance corresponding to one light-emitting region in each field period.

27. An apparatus according to claim 13, wherein the pixels in each unit are arranged in a square matrix with green and achromatic pixels positioned diagonally opposite in relation to each other.

28. An apparatus according to claim 14, wherein the pixels in each unit are arranged in a square matrix with green and achromatic pixels positioned diagonally opposite in relation to each other.

* * * * *